(12) United States Patent
Arai

(10) Patent No.: US 6,445,831 B1
(45) Date of Patent: Sep. 3, 2002

(54) IMAGE PROCESSING METHOD AND APPARATUS

(75) Inventor: Hisao Arai, Kanagawa-ken (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/244,950

(22) Filed: Feb. 10, 1999

(30) Foreign Application Priority Data

| Feb. 10, 1998 | (JP) | 10-028400 |
| Mar. 6, 1998 | (JP) | 10-054819 |
| Apr. 9, 1998 | (JP) | 10-097403 |

(51) Int. Cl.[7] .............................................. G06K 9/40
(52) U.S. Cl. ...................... 382/254; 382/266; 382/275; 358/447; 358/463
(58) Field of Search ............................... 382/263, 264, 382/266, 275, 254, 260, 262, 308; 358/447, 448, 463

(56) References Cited

U.S. PATENT DOCUMENTS

| 4,812,903 A | | 3/1989 | Wagensonner et al. ........ 358/80 |
| 5,134,667 A | * | 7/1992 | Suzuki ........................ 382/164 |
| 5,392,137 A | * | 2/1995 | Obuko ........................ 358/462 |
| 5,666,443 A | * | 9/1997 | Kumashiro ................. 382/266 |
| 5,739,922 A | | 4/1998 | Matama ...................... 358/447 |
| 5,926,577 A | * | 7/1999 | Kasahara et al. ........... 382/266 |
| 6,055,340 A | * | 4/2000 | Nagao ........................ 382/261 |

FOREIGN PATENT DOCUMENTS

| EP | 0 800 114 | 10/1987 | ............ G03C/8/40 |
| EP | 0 736 842 | 10/1996 | ............ G06T/5/40 |
| EP | 0 795 840 | 9/1997 | ............ G06T/7/00 |
| JP | 63-26783 | 2/1988 | ............ G06F/15/68 |
| JP | 9-91421 | 4/1997 | ............ G06T/5/20 |

OTHER PUBLICATIONS

"Detail–Preserving Smoothing with Morphology and Fuzzy Reasoning", Lee et al., Journal of Electronic Imaging, Jul. 1996, vol. 5(3) pp. 396–401.

* cited by examiner

Primary Examiner—Thomas D. Lee
(74) Attorney, Agent, or Firm—Sughrue Mion, PLLC

(57) ABSTRACT

Graininess suppression image processing is carried out on an original image signal, and a graininess suppression processing image signal is obtained from the graininess suppression image processing. Also, sharpness enhancement image processing is carried out on the original image signal, and a sharpness enhancement processing image signal is obtained from the sharpness enhancement image processing. Processing for obtaining a processed image signal is carried out in accordance with the graininess suppression processing image signal and the sharpness enhancement processing image signal. The processed image signal is obtained with operation processing carried out on image signal components of the graininess suppression processing image signal and the sharpness enhancement processing image signal, which image signal components represent corresponding pixels in two images represented by the graininess suppression processing image signal and the sharpness enhancement processing image signal.

22 Claims, 14 Drawing Sheets

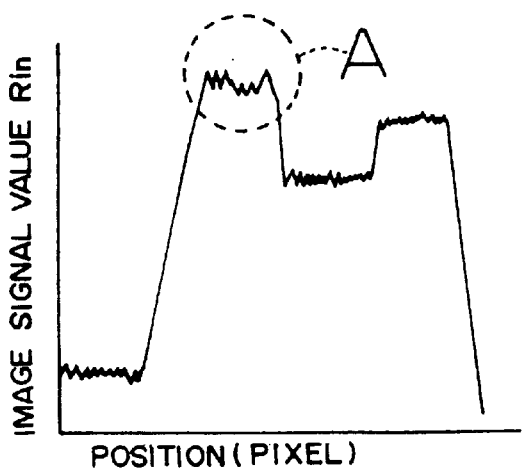
F I G. 12A
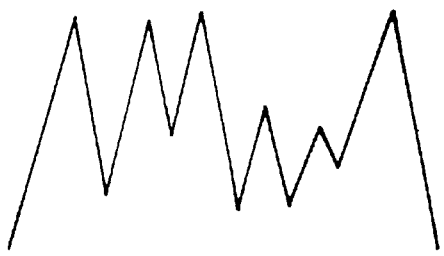
F I G. 12B
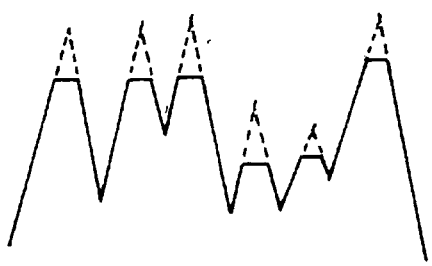
F I G. 12C
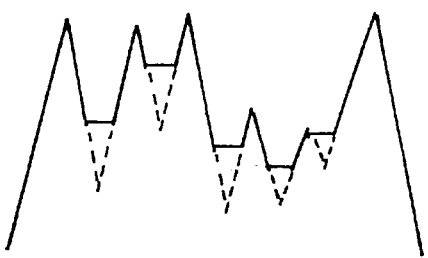
F I G. 12D
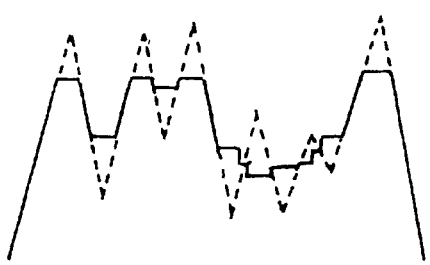
F I G. 12E

IMAGE PROCESSING METHOD AND APPARATUS

BACKGROUND OF THE INVENTION

1. Field of the Invention

This invention relates to an image processing method and apparatus. This invention particularly relates to an image processing method and apparatus, wherein sharpness of an image is enhanced, while graininess (high frequency noise) of the image is being suppressed. This invention also relates to an image processing method and apparatus, wherein graininess of an image is suppressed.

2. Description of the Related Art

With techniques for reading out an image (or a color image) and reproducing the image as a visible image, an image having been recorded on photographic film, a print, or the like, is photoelectrically read out with a sensor, such as a charge coupled device (CCD) image sensor, and an image signal is thereby obtained. Various image processing operations are carried out on the image signal, and a visible image is reproduced on a print, a cathode ray tube (CRT) display device, or the like, from the image signal, which has been obtained from the image processing. Examples of such image processing include processing in frequency domain, which acts upon predetermined frequency components contained in an image, and gradation processing, which acts upon image density, or the like.

Examples of the frequency processing in frequency domain include sharpness enhancement processing for suppressing blurr of a contour in an image, and graininess suppression processing, such as smoothing processing, for suppressing noise (graininess) due to grains of a photosensitive material, or the like.

As the sharpness enhancement processing, there have heretofore been known unsharp masking processing, high-band enhancement filter processing, processing disclosed in, for example, U.S. Pat. No. 5,739,922, wherein high frequency components of an image are enhanced and middle frequency components of the image are suppressed, and the like. As the graininess suppression processing, there have heretofore been known median filter processing, hysteresis smoothing processing, noise removal processing with iteration, graininess suppression processing utilizing a morphology operation, and the like.

With the sharpness enhancement processing, the sharpness of an image can be enhanced, but the problems occur in that the graininess of the image is also enhanced and a rough feeling of the image remains. With the graininess suppression processing, the graininess of an image can be suppressed and a rough feeling of the image can be reduced, but the problems occur in that the extent of the sharpness of the image becomes low.

Therefore, a need exists for an image processing method, with which the graininess can be suppressed and, at the same time, the sharpness can be enhanced. There have heretofore been proposed various image processing methods, which aim at simultaneously achieving graininess suppression and sharpness enhancement. (Such image processing methods have been proposed in, for example, U.S. Pat. No. 4,812,903, and Japanese Unexamined Patent Publication Nos. 63(1988)-26783 and U.S. Pat. No. 5,739,922.) However, with the proposed image processing methods, actually, both the graininess suppression and the sharpness enhancement cannot simultaneously be achieved efficiently.

For example, the technique disclosed in U.S. Pat. No. 5,739,922 aims at suppressing the graininess and enhancing the sharpness by carrying out processing for enhancing high frequency components, which affect the image sharpness, and suppressing middle frequency components, which affect the graininess that gives a rough feeling. The disclosed technique utilizes the characteristics in that the degree of correlation between colors is low at a grainy area and is high at a not-grainy area (edge area). Also, with the disclosed processing, an image is spread in the frequency domain, intensities of middle and high frequency components are controlled, and the extent of them is kept low with respect to an area having a low level of color correlation. In this manner, graininess suppression is carried out. Specifically, with the disclosed processing method, since the factor of the connection between adjacent pixels in an image is not taken into consideration, the extent of the intensities of frequency components changes sharply at a certain area in the image, and it cannot be felt that the graininess has been suppressed. Therefore, the effects of graininess suppression are small in comparison with the effects of the sharpness enhancement. From the aspect of the effects, the disclosed processing is actually the sharpness enhancement processing, instead of being the graininess suppression and sharpness enhancement processing.

SUMMARY OF THE INVENTION

The primary object of the present invention is to provide an image processing method, wherein graininess suppression and sharpness enhancement for an image are capable of being simultaneously achieved efficiently.

Another object of the present invention is to provide an image processing method, wherein graininess suppression and sharpness enhancement for an image are capable of being simultaneously achieved efficiently, and graininess suppression processing is not carried out with respect to a predetermined image area that is not to be suppressed.

A further object of the present invention is to provide a graininess suppression image processing method, wherein positive graininess and negative graininess are suppressed accurately.

The specific object of the present invention is to provide an apparatus for carrying out the image processing method.

A first image processing method in accordance with the present invention is characterized by carrying out sharpness enhancement image processing and graininess suppression image processing, respectively, on an original image signal, carrying out processing on image signal components of two image signals having been obtained from the sharpness enhancement image processing and the graininess suppression image processing, which image signal components represent corresponding pixels in two images represented by the two image signals, and thereby obtaining a processed image signal.

Specifically, the present invention provides a first image processing method, wherein predetermined processing is carried out on an original image signal (or each of original image signals representing an original color image) fin, which is made up of a series of image signal components defining values of pixels constituting an original image, and a processed image signal fout is thereby obtained, the method comprising the steps of:

i) carrying out graininess suppression image processing on the original image signal fin, a graininess suppression processing image signal f1 being obtained from the graininess suppression image processing, ii) carrying out sharpness enhancement image processing on the original image signal fin, a sharpness enhancement processing image signal f2 being obtained from the sharpness enhancement image processing, and iii) carrying out processing for obtaining the processed image signal fout in accordance with the graininess suppression processing image signal f1 and the sharpness enhancement processing image signal f2, the processed image signal fout being obtained with operation processing carried out on image signal components of the graininess suppression processing image signal f1 and the sharpness enhancement processing image signal f2, which image signal components represent corresponding pixels in two images represented by the graininess suppression processing image signal f1 and the sharpness enhancement processing image signal f2.

Details of the operation processing may vary for the pixels or may be common to all of the pixels. Also, the details of the operation processing may be selected from a plurality of kinds of predetermined operations and in accordance with, for example, relationship with the value of the original image signal fin, the kind of the image, or the position of a picture element. Alternatively, information representing the details of the operation processing may be inputted from the exterior each time the processing is to be carried out.

Specifically, as the operation processing described above, the operation processing defined with Formula (1) shown below may be employed:

$$fout = w1 \cdot f1 + w2 \cdot f2 \quad (1)$$

wherein w1 and w2 represent weight factors, w1+w2=1 (0<w1<1, 0<w2<1), fout represents the processed image signal, f1 represents the graininess suppression processing image signal, and f2 represents the sharpness enhancement processing image signal.

Specifically, with the operation processing defined with Formula (1), the processed image signal fout is obtained by weighting the graininess suppression processing image signal f1 and the sharpness enhancement processing image signal f2 and adding the weighted image signals to each other. In the operation processing defined with Formula (1) shown above, the values of the weight factors w1 and w2 may be altered in accordance with the relationship with the value of the original image signal, or the like. Alternatively, the weight factors common to all of the pixels may be set.

Each of the weight factors w1 and w2 should preferably take a value falling within the range of 0.2 to 0.8, should more preferably take a value falling within the range of 0.3 to 0.7, and should most preferably take a value falling within the range of 0.4 to 0.6.

Alternatively, as the operation processing described above, the operation processing defined with Formula (2) shown below may be employed:

$$fout = \{|f1-fin|(f1-fin) + |f2-fin|(f2-fin)\}/\{|f1-fin| + |f2-fin|\} + fin \quad (2)$$

wherein fin represents the original image signal, fout represents the processed image signal, f1 represents the graininess suppression processing image signal, and f2 represents the sharpness enhancement processing image signal.

Specifically, with the operation processing defined with Formula (2), as for a picture element, at which the value of the graininess suppression processing image signal is equal to the value of the original image signal, the value of the sharpness enhancement processing image signal is taken as the value of the processed image signal. As for a picture element, at which the value of the sharpness enhancement processing image signal is equal to the value of the original image signal, the value of the graininess suppression processing image signal is taken as the value of the processed image signal. As for a picture element, at which the value of the graininess suppression processing image signal and the value of the sharpness enhancement processing image signal are not equal to the value of the original image signal, the addition through weighting with the difference between the graininess suppression processing image signal or the sharpness enhancement processing image signal, whichever has a larger difference with respect to the original image signal, and the original image signal is carried out, and the value obtained from the weighting addition is taken as the value of the processed image signal. The operation processing defined with Formula (2) is one of the examples, wherein the processing is selected for each of the pixels in accordance with the relationship with the value of the original image signal (fin).

As the graininess suppression image processing (and the graininess suppression image processing carried out by a graininess suppression processing means, which will be described later), it is possible to employ median filter processing, hysteresis smoothing processing, noise removal processing with iteration, graininess suppression processing (smoothing processing) utilizing a morphology operation, or the like. As the sharpness enhancement image processing, it is possible to employ unsharp masking processing, highband enhancement filter processing, processing disclosed in, for example, U.S. Pat. No. 5,739,922, wherein an image signal is separated into low frequency components, middle frequency components, and high frequency components, wherein enhancement and suppression processing is carried out such that the high frequency components may be enhanced and the middle frequency components may be suppressed, and wherein the high frequency components and the middle frequency components, which have been obtained from the enhancement and suppression processing, and the low frequency components are combined with one another, or the like. As the graininess suppression image processing and the sharpness enhancement image processing, there should preferably be employed a combination of the graininess suppression processing (smoothing processing), which utilizes a morphology operation, and the sharpness enhancement processing (disclosed in, for example, U.S. Pat. No. 5,739,922, wherein the enhancement and suppression processing is carried out such that the high frequency components of an image may be enhanced and the middle frequency components of the image may be suppressed, and wherein the high frequency components and the middle frequency components, which have been obtained from the enhancement and suppression processing, and the low frequency components are combined with one another.

In general, the morphology operation processing is expanded as the theory of sets in an N-dimensional space. Also, the morphology operation processing is often applied to an image in a two-dimensional space (as described in, for example, U.S. Ser. No. 08/623,223, U.S. Ser. No. 08/818, 039 and Japanese Unexamined Patent Publication No. 9(1997)-91421). The morphology operation processing will hereinbelow be described briefly by taking a gray level image as an example.

The gray level image is considered as a space, in which a point having coordinates (x, y) has a height corresponding to an image density value f(x, y). Also, a one-dimensional function f(x) corresponding to the cross-section of the gray level image is considered. It is assumed that a structure element g used in the morphology operation processing is a symmetric function of Formula (5) shown below, which is symmetric with respect to the origin.

$$g^s(x)=g(-x) \quad (5)$$

It is also assumed that the value is 0 in a domain of definition G, which is represented by Formula (6) shown below.

$$G=\{-m, -m+1, \ldots, -1, 0, 1, \ldots, m-1, m\} \quad (6)$$

In such cases, the fundamental forms of the morphology operation are very simple operations carried out with Formulas (7), (8), (9), and (10) shown below.

$$\text{dilation; } [f\oplus G^s](i)=\max\{f(i-m), \ldots, f(i), \ldots, f(i+m)\} \quad (7)$$

$$\text{erosion; } [f\ominus G^s](i)=\min\{f(i-m), \ldots, f(i), \ldots, f(i+m)\} \quad (8)$$

$$\text{opening; } f_g=(f\ominus g^s)\oplus g \quad (9)$$

$$\text{closing; } f^g=(f\oplus g^s)\ominus g \quad (10)$$

Specifically, as illustrated in FIG. 4A, the dilation processing is the processing for retrieving the maximum value in the region of a width of ±m (which width is the value determined in accordance with the structure element B and corresponds to the mask size shown in FIG. 4A) having its center at a picture element of interest. As illustrated in FIG. 4B, the erosion processing is the processing for retrieving the minimum value in the region of the width of ±m having its center at the picture element of interest. The opening processing is equivalent to the processing in which the dilation processing is carried out after the erosion processing, i.e., the processing in which the maximum value is searched after the searching of the minimum value. Also, the closing processing is equivalent to the processing in which the erosion processing is carried out after the dilation processing, i.e., the processing in which the minimum value is searched after the searching of the maximum value.

More specifically, as illustrated in FIG. 4C, the opening processing is equivalent to the processing for smoothing the image density curve f(x) from the low density side, and removing a convex image density fluctuating area (i.e., the area at which the density is higher than that of the surrounding areas), which fluctuates in a region spatially narrower than the mask size of 2 m.

Also, as illustrated in FIG. 4D, the closing processing is equivalent to the processing for smoothing the image density curve f(x) from the high density side, and removing a concave image density fluctuating area (i.e., the area at which the density is lower than that of the surrounding areas), which fluctuates in the region spatially narrower than the mask size of 2 m.

In cases where the image signal representing the image density value f(x) is a high image density-high signal level type of image signal, in which a high image density is represented by a high image signal level, the relationship between the image density value f(x) and the image signal value becomes reverse to the relationship between the image density value f(x) and the image signal value in the high luminance-high image signal level type of image signal. Therefore, the dilation processing, which is carried out on the high image density-high signal level type of image signal, coincides with the erosion processing, which is carried out on the high luminance-high signal level type of image signal as shown in FIG. 4B. The erosion processing, which is carried out on the high image density-high signal level type of image signal, coincides with the dilation processing, which is carried out on the high luminance-high signal level type of image signal as shown in FIG. 4A. The opening processing, which is carried out on the high image density-high signal level type of image signal, coincides with the closing processing, which is carried out on the high luminance-high signal level type of image signal as shown in FIG. 4D. Also, the closing processing, which is carried out on the high image density-high signal level type of image signal, coincides with the opening processing, which is carried out on the high luminance-high signal level type of image signal as shown in FIG. 4C.

In the manner described above, the opening processing or the closing processing with the morphology operation processing may be carried out on the image signal representing an original image. As a result, graininess (i.e., noise in the image signal) in the image can be suppressed (or removed). (Such features are described in, for example, "Morphology" by Kobatake, published by Corona Co.).

The morphology operation processing, which is preferable in the image processing method in accordance with the present invention, will be described later.

The sharpness enhancement processing (disclosed in, for example, U.S. Pat. No. 5,739,922, wherein the enhancement and suppression processing is carried out such that the high frequency components of an image may be enhanced and the middle frequency components of the image may be suppressed, will hereinbelow be described briefly.

With the disclosed sharpness enhancement processing, an image signal is separated into low frequency components, middle frequency components, and high frequency components, and enhancement and suppression processing is carried out such that the high frequency components may be enhanced and the middle frequency components may be suppressed. The high frequency components and the middle frequency components, which have been obtained from the enhancement and suppression processing, and the low frequency components are then combined with one another, and a processed image signal is thereby obtained.

FIG. 5 is a graph showing how low, middle, and high frequency components are distributed. The term "low frequency components, middle frequency components, and high frequency components of an image signal" as used herein means the frequency components, which are distributed in the patterns shown in FIG. 5. The middle frequency components are distributed such that they may have a peak in the vicinity of ⅓ of the Nyquist frequency of the output in the reproduction of a visible image from the signal having been processed. The low frequency components are distributed such that they may have a peak at a frequency, at which the Nyquist frequency of the output becomes equal to 0. The high frequency components are distributed such that they may have a peak at the Nyquist frequency of the output. At each frequency, the sum of the low, middle, and high frequency components becomes equal to 1.

In the disclosed sharpness enhancement processing, the processing should preferably be constituted such that, after the separation, luminance components may be extracted from the high frequency components and the middle frequency components, and the enhancement and suppression processing and the combining may be carried out in accordance with only the luminance components.

Also, in the disclosed sharpness enhancement processing, the processing should preferably be constituted such that a specific color region may be extracted from the given image, and the enhancement and suppression processing may be carried out such that the middle frequency components, which correspond to the specific color region, may be suppressed even further.

Further, in the disclosed sharpness enhancement processing, the processing should preferably be constituted such that, after the separation, a calculation may be made to find a rating value of the middle frequency components and/or the high frequency components, and the enhancement and suppression processing may be carried out such that the middle frequency components corresponding to pixels, which are associated with the rating values smaller than a predetermined threshold value, may be more suppressed than the middle frequency components corresponding to pixels, which are associated with the rating values larger than the predetermined threshold value, are. In such cases, the high frequency components corresponding to the pixels, which are associated with the rating values smaller than the predetermined threshold value, should preferably be less enhanced than the high frequency components corresponding to the pixels, which are associated with the rating values larger than the predetermined threshold value, are.

The term "rating value" as used herein means a value, such as a correlation value between at least a single set of two colors, which are among red, green, and blue three colors, as will be described later, or a local area limited variance value of the frequency components of the image signal.

The rating value should preferably be a correlation value between at least a single set of two colors, which are among red, green, and blue three colors, the correlation value being calculated from the middle frequency components and/or the high frequency components, which are of the respective colors and correspond to the same picture element.

Also, the rating value may be subjected to a filter processing with a median filter, and thereafter the enhancement and suppression processing may be carried out by using the predetermined threshold value and in accordance with the rating value, which has been obtained from the filter processing with the medial filter.

Further, the calculation of the middle frequency components and/or the high frequency components and the calculation of the rating value may be carried out respectively in accordance with different colors, which are among red, green, and blue three colors.

Furthermore, the degrees of the enhancement and the suppression in the enhancement and suppression processing should preferably be determined by being selected from a plurality of enhancement and suppression processing conditions, which have been determined previously in accordance with image reproducing conditions in the reproduction of a visible image from the processed image signal.

The term "image reproducing conditions" as used herein means the conditions, which affect the characteristics of the reproduced visible image, such as the kind of the recording medium on which the given image was recorded (e.g., negative film or reversal film), the size of the print on which the visible image is reproduced, or a correction amount which is specified by an operator from a keyboard such that a desired image processing may be carried out.

As described above, with the graininess suppression in the enhancement and suppression processing disclosed in U.S. Pat. No. 5,739,922, since the factor of the connection between adjacent pixels in an image is not taken into consideration, it cannot be felt that the graininess has been suppressed. However, the graininess suppression processing utilizing the morphology operation is the processing on the image plane utilizing the isolation characteristics of graininess (graininess has low continuity of image signal (image density) with adjacent pixels). Therefore, with the graininess suppression processing utilizing the morphology operation, the connection between adjacent pixels can be kept good, the extent of graininess suppression can be felt visually, and large effects of graininess suppression can be obtained.

The present invention also provides a first image processing apparatus for carrying out the first image processing method in accordance with the present invention. Specifically, the present invention also provides a first image processing apparatus, wherein predetermined processing is carried out on an original image signal, which is made up of a series of image signal components defining values of pixels constituting an original image, and a processed image signal is thereby obtained, the apparatus comprising:

i) a graininess suppression processing means for carrying out graininess suppression image processing on the original image signal, a graininess suppression processing image signal being obtained from the graininess suppression image processing, ii) a sharpness enhancement processing means for carrying out sharpness enhancement image processing on the original image signal, a sharpness enhancement processing image signal being obtained from the sharpness enhancement image processing, and iii) a signal processing means for carrying out processing for obtaining the processed image signal in accordance with the graininess suppression processing image signal, which has been obtained from the graininess suppression processing means, and the sharpness enhancement processing image signal, which has been obtained from the sharpness enhancement processing means, the processed image signal being obtained with operation processing carried out on image signal components of the graininess suppression processing image signal and the sharpness enhancement processing image signal, which image signal components represent corresponding pixels in two images represented by the graininess suppression processing image signal and the sharpness enhancement processing image signal.

The operation processing, which is carried out by the signal processing means, may vary for the pixels or may be common to all of the pixels. However, the operation processing should preferably be set so as to vary for the pixels. In such cases, graininess can be suppressed appropriately and sharpness can be enhanced appropriately in accordance with details of a structure embedded in the image, or the like.

Also, as the operation processing, which is carried out by the signal processing means, the operation processing described above, which is defined with Formula (1) or Formula (2) shown above, should preferably be employed.

The first image processing method in accordance with the present invention should preferably be modified such that, after the graininess suppression image processing and the sharpness enhancement image processing have respectively been carried out on the original image signal, threshold value processing with a difference between the original image signal and the graininess suppression processing image signal may be carried out, and details of subsequent processing may be altered in accordance with the results of the threshold value processing. In cases where the degree of the graininess suppression is high (i.e., in cases where the difference is larger than a threshold value), graininess suppression processing may not be carried out. In cases where the degree of the graininess suppression is low (i.e., in cases where the difference is smaller than the threshold value), the operation processing described above may be carried out. (Such a modification constitutes a second image processing method in accordance with the present invention.)

Specifically, the present invention further provides a second image processing method, wherein predetermined processing is carried out on an original image signal (or each of original image signals representing an original color image)

fin, which is made up of a series of image signal components defining values of pixels constituting an original image, and a processed image signal fout is thereby obtained, the method comprising the steps of:

i) carrying out graininess suppression image processing on the original image signal fin, a graininess suppression processing image signal f1 being obtained from the graininess suppression image processing, ii) carrying out sharpness enhancement image processing on the original image signal fin, a sharpness enhancement processing image signal f2 being obtained from the sharpness enhancement image processing, iii) calculating a difference |f1−fin| between image signal components of the graininess suppression processing image signal f1 and the original image signal fin, which image signal components represent corresponding pixels in two images represented by the graininess suppression processing image signal f1 and the original image signal fin, iv) comparing the calculated difference and a predetermined threshold value T with each other, v) with respect to pixels, which have been found, as a result of the comparison, to be associated with the difference smaller than the predetermined threshold value (|f1−fin|<T), obtaining the processed image signal fout with the operation processing described above, i.e., with operation processing carried out on image signal components of the graininess suppression processing image signal f1 and the sharpness enhancement processing image signal f2, which image signal components represent corresponding pixels in two images represented by the graininess suppression processing image signal f1 and the sharpness enhancement processing image signal f2, and vi) with respect to pixels, which have been found, as a result of the comparison, to be associated with the difference larger than the predetermined threshold value (|f1−fin|>T), taking the original image signal fin, an enhancement processing signal Fin', which is obtained by carrying out enhancement processing on the original image signal fin, or the sharpness enhancement processing image signal f2 as the processed image signal fout.

In the second image processing method in accordance with the present invention, with respect to pixels, which are associated with the difference |f1−fin| equal to the threshold value T (|f1−fin|=T), the operation processing employed with respect to the pixels, which are associated with the difference smaller than the threshold value T, may be carried out. Alternatively, with respect to such pixels, the processing employed with respect to the pixels, which are associated with the difference larger than the threshold value T, may be carried out. However, in such cases, the former processing (i.e., the operation processing employed with respect to the pixels, which are associated with the difference smaller than the threshold value T) should preferably be employed.

Also, the details of the operation processing may be selected from a plurality of kinds of predetermined operations and in accordance with, for example, the kind of the image or the position of a picture element. Alternatively, information representing the details of the operation processing may be inputted from the exterior each time the processing is to be carried out.

Specifically, in the second image processing method in accordance with the present invention, as the operation processing, the operation processing described above, which is defined with Formula (1) shown below, may be employed:

$$fout = w1 \cdot f1 + w2 \cdot f2 \quad (1)$$

wherein w1 and w2 represent weight factors, w1+w2=1 (0<w1<1, 0<w2<1), fout represents the processed image signal, f1 represents the graininess suppression processing image signal, and f2 represents the sharpness enhancement processing image signal.

Specifically, with the operation processing defined with Formula (1), the processed image signal fout is obtained by weighting the graininess suppression processing image signal f1 and the sharpness enhancement processing image signal f2 and adding the weighted image signals to each other. In the operation processing defined with Formula (1) shown above, the values of the weight factors w1 and w2 may be altered in accordance with the kind of the image, the position of a picture element, the relationship with the value of the original image signal, or the like. Alternatively, the weight factors common to all of the pixels may be set.

Each of the weight factors w1 and w2 should preferably take a value falling within the range of 0.2 to 0.8, should more preferably take a value falling within the range of 0.3 to 0.7, and should most preferably take a value falling within the range of 0.4 to 0.6.

Alternatively, in the second image processing method in accordance with the present invention, as the operation processing, the operation processing described above, which is defined with Formula (2) shown below, may be employed:

$$fout = \{|f1-fin|(f1-fin) + |f2-fin|(f2-fin)\} / \{|f1-fin| + |f2-fin|\} + fin \quad (2)$$

wherein fin represents the original image signal, fout represents the processed image signal, f1 represents the graininess suppression processing image signal, and f2 represents the sharpness enhancement processing image signal.

Further, as in the first image processing method in accordance with the present invention, as the graininess suppression image processing, it is possible to employ median filter processing, hysteresis smoothing processing, noise removal processing with iteration, graininess suppression processing (smoothing processing) utilizing a morphology operation, or the like. As the sharpness enhancement image processing, it is possible to employ unsharp masking processing, high-band enhancement filter processing, processing disclosed in, for example, U.S. Pat. No. 5,739,922, wherein an image signal is separated into low frequency components, middle frequency components, and high frequency components, wherein enhancement and suppression processing is carried out such that the high frequency components may be enhanced and the middle frequency components may be suppressed, and wherein the high frequency components and the middle frequency components, which have been obtained from the enhancement and suppression processing, and the low frequency components are combined with one another, or the like. As the graininess suppression image processing and the sharpness enhancement image processing, there should preferably be employed a combination of the graininess suppression processing (smoothing processing), which utilizes a morphology operation, and the sharpness enhancement processing (disclosed in, for example, U.S. Pat. No. 5,739,922, wherein the enhancement and suppression processing is carried out such that the high frequency components of an image may be enhanced and the middle frequency components of the image may be suppressed, and wherein the high frequency components and the middle frequency components, which have been obtained from the enhancement and suppression processing, and the low frequency components are combined with one another.

The predetermined threshold value T, which is compared with the difference |f1−fin| between the graininess suppression processing image signal f1 and the original image signal fin, varies in accordance with, for example, the kind of the recording medium, on which the original image is recorded, and details (frequency, and the like) of an image area, which is not to be subjected to graininess suppression, such as a catch lights area, which is reflected in the pupil of the eye of a human body and is considered to be essential to portraits. From the results of experiments carried out by the inventors and experience of the inventors, the threshold value T should preferably be equal to a value, α×D (where $0.01 \leq \alpha \leq 0.20$), which falls within the range of 1% to 20% of the number D of gradation levels, which the original image signal fin can take. (In cases where the original image signal can take 10-bit gradation levels, $D=2^{10}=1,024$ gradation levels, which correspond to signal values of 0 to 1,023.) The threshold value T should more preferably be equal to a value, α×D (where $0.02 \leq \alpha \leq 0.10$), which falls within the range of 2% to 10% of the number D of gradation levels, which the original image signal fin can take. In cases where the threshold value T takes a value falling within the range described above, the image area, which is not to be subjected to graininess suppression, such as a catch lights area, can be prevented from being subjected to the graininess suppression processing, and a processed image can be obtained, in which both the graininess suppression and the sharpness enhancement have been achieved more efficiently.

The present invention still further provides a second image processing apparatus for carrying out the second image processing method in accordance with the present invention. Specifically, the present invention still further provides a second image processing apparatus, wherein predetermined processing is carried out on an original image signal, which is made up of a series of image signal components defining values of pixels constituting an original image, and a processed image signal is thereby obtained, the apparatus comprising:

i) a graininess suppression processing means for carrying out graininess suppression image processing on the original image signal, a graininess suppression processing image signal being obtained from the graininess suppression image processing, ii) a sharpness enhancement processing means for carrying out sharpness enhancement image processing on the original image signal, a sharpness enhancement processing image signal being obtained from the sharpness enhancement image processing, iii) a comparison means for calculating a difference between image signal components of the graininess suppression processing image signal, which has been obtained from the graininess suppression processing means, and the original image signal, which image signal components represent corresponding pixels in two images represented by the graininess suppression processing image signal and the original image signal fin, and comparing the calculated difference and a predetermined threshold value with each other, and iv) a signal processing means for carrying out processing, which comprises the steps of:

a) with respect to pixels, which have been found, as a result of the comparison made by the comparison means, to be associated with the difference smaller than the predetermined threshold value, obtaining the processed image signal by carrying out operation processing on image signal components of the graininess suppression processing image signal and the sharpness enhancement processing image signal having been obtained from the sharpness enhancement processing means, which image signal components represent corresponding pixels in two images represented by the graininess suppression processing image signal and the sharpness enhancement processing image signal, and b) with respect to pixels, which have been found, as a result of the comparison, to be associated with the difference larger than the predetermined threshold value, taking the original image signal, an enhancement processing signal, which is obtained by carrying out enhancement processing on the original image signal, or the sharpness enhancement processing image signal as the processed image signal.

In the second image processing apparatus in accordance with the present invention, as the operation processing, which is carried out by the signal processing means, the operation processing described above, which is defined with Formula (1) or Formula (2) shown below, should preferably be employed.

$$fout = w1 \cdot f1 + w2 \cdot f2 \qquad (1)$$

wherein w1 and w2 represent weight factors, $w1+w2=1$ ($0<w1<1$, $0<w2<1$), fout represents the processed image signal, f1 represents the graininess suppression processing image signal, and f2 represents the sharpness enhancement processing image signal.

$$fout = \{|f1-fin|(f1-fin) + |f2-fin|(f2-fin)\} / \{|f1-fin| + |f2-fin|\} + fin \qquad (2)$$

wherein fin represents the original image signal, fout represents the processed image signal, f1 represents the graininess suppression processing image signal, and f2 represents the sharpness enhancement processing image signal.

The predetermined threshold value T, which is compared with the difference |f1−fin| between the graininess suppression processing image signal f1 and the original image signal fin, should preferably be equal to a value, α×D (where $0.01 \leq \alpha \leq 0.20$), which falls within the range of 1% to 20% of the number D of gradation levels, which the original image signal fin can take. The threshold value T should more preferably be equal to a value, α×D (where $0.02 \leq \alpha \leq 0.10$), which falls within the range of 2% to 10% of the number D of gradation levels, which the original image signal fin can take.

Third and fourth image processing methods in accordance with the present invention are characterized by carrying out opening processing in accordance with a morphology operation and closing processing in accordance with a morphology operation, respectively, on an original image signal, carrying out operation processing on image signal components of two image signals having been obtained from the opening processing and the closing processing, which image signal components represent corresponding pixels in two images represented by the two image signals, and thereby obtaining a processed image signal (in this case, a graininess suppression processing image signal). The third and fourth image processing methods in accordance with the present invention are appropriate for the graininess suppression image processing utilizing the morphology operation described above.

Specifically, the present invention also provides a third image processing method, wherein predetermined processing is carried out on an original image signal (or each of a luminance signal and color difference signals, each of original image signals representing an original color image, or the like) fin, which is made up of a series of image signal components defining values of pixels constituting an original image, and a processed image signal (in this case, a graininess suppression processing image signal) fout is thereby obtained, the method comprising the steps of:

i) carrying out opening processing in accordance with a morphology operation on the original image signal fin, an opening processing image signal fopn being obtained from the opening processing, ii) carrying out closing processing in accordance with the morphology operation on the original image signal fin, a closing processing image signal fcls being obtained from the closing processing, and iii) carrying out processing for obtaining the processed image signal (in this case, the graininess suppression processing image signal) fout in accordance with the opening processing image signal fopn and the closing processing image signal fcls, the processed image signal fout being obtained with operation processing g(fopn, fcls) (=fout) carried out on image signal components of the opening processing image signal fopn and the closing processing image signal fcls, which image signal components represent corresponding pixels in two images represented by the opening processing image signal fopn and the closing processing image signal fcls, the operation processing being defined with Formula (3):

$$fout = \begin{cases} fopn & (\text{if } fcls = fin) \\ fcls & (\text{if } fopn = fin) \\ w1 \cdot fopn + w2 \cdot fcls & (\text{else}) \end{cases} \quad (3)$$

wherein w1 and w2 represent weight factors, w1+w2=1 (0<w1<1, 0<w2<1), fin represents the original image signal, fout represents the processed image signal (in this case, the graininess suppression processing image signal), fopn represents the opening processing image signal, and fcls represents the closing processing image signal.

Specifically, with the operation processing defined with Formula (3), as for a picture element, at which the value of the closing processing image signal fcls is equal to the value of the original image signal fin, the value of the opening processing image signal fopn is taken as the value of the processed image signal fout. As for a picture element, at which the value of the opening processing image signal fopn is equal to the value of the original image signal fin, the value of the closing processing image signal fcls is taken as the value of the processed image signal fout. As for a picture element, at which the value of the closing processing image signal fcls and the value of the opening processing image signal fopn are not equal to the value of the original image signal fin, the addition processing through the weighting with the weight factors w1 and w2 is carried out on the closing processing image signal fcls and the opening processing image signal fopn.

As for how to determine the weight factors w1 and w2, one of various techniques for determination may be employed. Each of the weight factors w1 and w2 should preferably take a value falling within the range of 0.2 to 0.8, and should more preferably take a value falling within the range of 0.3 to 0.7. Each of the weight factors w1 and w2 should even further preferably take a value falling within the range of 0.4 to 0.6, and should most preferably take a value of 0.5.

The present invention further provides a fourth image processing method, wherein predetermined processing is carried out on an original image signal (or each of a luminance signal and color difference signals, each of original image signals representing an original color image, or the like) fin, which is made up of a series of image signal components defining values of pixels constituting an original image, and a processed image signal (in this case, a graininess suppression processing image signal) fout is thereby obtained, the method comprising the steps of:

i) carrying out opening processing in accordance with a morphology operation on the original image signal fin, an opening processing image signal fopn being obtained from the opening processing, ii) carrying out closing processing in accordance with the morphology operation on the original image signal fin, a closing processing image signal fcls being obtained from the closing processing, and iii) carrying out processing for obtaining the processed image signal (in this case, the graininess suppression processing image signal) fout in accordance with the opening processing image signal fopn and the closing processing image signal fcls, the processed image signal fout being obtained with operation processing g(fopn, fcls) (=fout) carried out on image signal components of the opening processing image signal fopn and the closing processing image signal fcls, which image signal components represent corresponding pixels in two images represented by the opening processing image signal fopn and the closing processing image signal fcls, the operation processing being defined with Formula (4):

$$fout = \{|fopn-fin|(fopn-fin)+|fcls-fin|(fcls-fin)\}/\{|fopn-fin|+|fcls-fin|\}+fin \quad (4)$$

Specifically, with the operation processing defined with Formula (4), as for a picture element, at which the value of the opening processing image signal fopn is equal to the value of the original image signal fin, the value of the closing processing image signal fcls is taken as the value of the processed image signal fout. As for a picture element, at which the value of the closing processing image signal fcls is equal to the value of the original image signal fin, the value of the opening processing image signal fopn is taken as the value of the processed image signal fout. As for a picture element, at which the value of the opening processing image signal fopn and the value of the closing processing image signal fcls are not equal to the value of the original image signal fin, the addition through weighting with the difference (|fopn−fin| or |fcls−fin|) between the opening processing image signal fopn or the closing processing image signal fcls, whichever has a larger difference with respect to the original image signal fin, (i.e., fopn or fcls) and the original image signal fin is carried out, and the value obtained from the weighting addition is taken as the value of the processed image signal fout.

The present invention still further provides a third image processing apparatus for carrying out the third image processing method in accordance with the present invention. Specifically, the present invention still further provides a third image processing apparatus, wherein predetermined processing is carried out on an original image signal, which is made up of a series of image signal components defining values of pixels constituting an original image, and a processed image signal (in this case, a graininess suppression processing image signal) is thereby obtained, the apparatus comprising:

i) a morphology operation processing means for carrying out opening processing and closing processing in accordance with a morphology operation, respectively, on the original image signal, an opening processing image signal being obtained from the opening processing, a closing processing image signal being obtained from the closing processing, and ii) a signal processing means for carrying out processing for obtaining the processed image signal (in this case, the graininess suppression processing image signal) in accordance with the opening processing image signal and the closing processing image signal, which have been obtained from the morphology operation processing means, the processed image signal being obtained with operation processing carried out on image signal components of the opening processing image signal and the closing processing image signal, which image signal components represent corresponding pixels in two images represented by the opening processing image signal and the closing processing image signal, the operation processing being defined with Formula (3) shown above.

In the third image processing apparatus in accordance with the present invention, as in the third image processing method in accordance with the present invention, one of various techniques for determining the weight factors w1 and w2, may be employed. Also, each of the weight factors w1 and w2 should preferably take a value falling within the range described above.

The present invention also provides a fourth image processing apparatus for carrying out the fourth image processing method in accordance with the present invention. Specifically, the present invention also provides a fourth image processing apparatus, wherein predetermined processing is carried out on an original image signal, which is made up of a series of image signal components defining values of pixels constituting an original image, and a processed image signal (in this case, a graininess suppression processing image signal) is thereby obtained, the apparatus comprising:

i) a morphology operation processing means for carrying out opening processing and closing processing in accordance with a morphology operation, respectively, on the original image signal, an opening processing image signal being obtained from the opening processing, a closing processing image signal being obtained from the closing processing, and ii) a signal processing means for carrying out processing for obtaining the processed image signal (in this case, the graininess suppression processing image signal) in accordance with the opening processing image signal and the closing processing image signal, which have been obtained from the morphology operation processing means, the processed image signal being obtained with operation processing carried out on image signal components of the opening processing image signal and the closing processing image signal, which image signal components represent corresponding pixels in two images represented by the opening processing image signal and the closing processing image signal, the operation processing being defined with Formula (4) shown above.

In the third and fourth image processing methods and the third and fourth image processing apparatuses in accordance with the present invention, in order for the processing to be simplified, the structure element employed in the opening processing and the structure element employed in the closing processing should preferably have the same size and the same shape.

With the first image processing method and the first image processing apparatus in accordance with the present invention, each of the sharpness enhancement image processing and the graininess suppression image processing is carried out on the original image signal, and the operation processing is carried out on the image signal components of the two image signals having been obtained from the sharpness enhancement image processing and the graininess suppression image processing, which image signal components represent corresponding pixels in the two images represented by the two image signals. In this manner, the processed image signal is obtained. Therefore, the graininess suppression and the sharpness enhancement for the image can be simultaneously achieved more efficiently than with the conventional various methods or apparatuses.

With the first image processing method and the first image processing apparatus in accordance with the present invention, wherein the details of the operation processing vary for the pixels, instead of being set to be common to all of the pixels, graininess can be suppressed appropriately and sharpness can be enhanced appropriately in accordance with the details of structure patterns embedded in the image.

With the first image processing method and the first image processing apparatus in accordance with the present invention, wherein the operation processing defined with Formula (1) is employed, the weighted mean value of the graininess suppression processing image signal, in which graininess has been suppressed by the graininess suppression image processing, and the sharpness enhancement processing image signal, in which sharpness has been enhanced by the sharpness enhancement image processing, is calculated. In this manner, sharpness can be enhanced, while graininess is being suppressed.

With the first image processing method and the first image processing apparatus in accordance with the present invention, wherein the operation processing defined with Formula (2) is employed, as for a picture element, at which the value of the graininess suppression processing image signal is equal to the value of the original image signal, the value of the sharpness enhancement processing image signal is taken as the value of the processed image signal. As for a picture element, at which the value of the sharpness enhancement processing image signal is equal to the value of the original image signal, the value of the graininess suppression processing image signal is taken as the value of the processed image signal. As for a picture element, at which the value of the graininess suppression processing image signal and the value of the sharpness enhancement processing image signal are not equal to the value of the original image signal, the addition through weighting with the difference between the graininess suppression processing image signal or the sharpness enhancement processing image signal, whichever has a larger difference with respect to the original image signal, and the original image signal is carried out, and the value obtained from the weighting addition is taken as the value of the processed image signal. Therefore, as for a picture element corresponding to a flat image density area (i.e., an image area having little change in image density or luminance), at which graininess is more perceptible than sharpness is, the value of the graininess suppression processing image signal is taken as the value of the image signal representing the picture element, and graininess can thereby be suppressed. Also, as for a picture element corresponding to an image edge area (i.e., an image area having a sharp change in image density or luminance), at which sharpness is more perceptible than graininess is, the value of the sharpness enhancement processing image signal is taken as the value of the image signal representing the picture element, and sharpness can thereby be suppressed.

As the graininess suppression image processing and the sharpness enhancement image processing, there should preferably be employed a combination of the graininess suppression processing, which utilizes the morphology operation, and the sharpness enhancement processing (disclosed in U.S. Pat. No. 5,739,922, wherein the enhancement and suppression processing is carried out such that the high frequency components of the image may be enhanced and the middle frequency components of the image may be suppressed, and wherein the high frequency components and the middle frequency components, which have been obtained from the enhancement and suppression processing, and the low frequency components are combined with one another. In such cases, the effects described below can be obtained.

Specifically, in particular, in cases where the operation processing defined with Formula (2) is employed, if graininess suppression has not been carried out on a sharpness enhancement area, and if sharpness enhancement is carried out extremely, graininess will also be enhanced, and the difference with respect to the original image signal will become larger than the difference between the graininess suppression processing image signal and the original image signal, and consequently graininess suppression will not be effected. Therefore, in cases where Formula (2) is employed, the sharpness enhancement processing disclosed in U.S. Pat. No. 5,739,922, in which the effects of graininess suppression can be obtained to a certain extent also with the sharpness enhancement processing, should preferably be employed.

Also, in cases where the image edge area has become dull due to the graininess suppression processing, such results affect the results of the sharpness enhancement processing. Therefore, the graininess suppression processing utilizing the morphology operation, with which graininess suppression can be carried out such that the image edge area may not become dull, should preferably be employed.

As described above, as the graininess suppression image processing, graininess suppression processing having the edge retaining effects, such as the graininess suppression processing utilizing the morphology operation, may be employed. As the sharpness enhancement image processing, sharpness enhancement processing having a certain extent of graininess suppression effects, such as the sharpness enhancement processing disclosed in U.S. Pat. No. 5,739,922, may be employed. Particularly, in cases where the operation processing defined with Formula (2) is employed, the graininess suppression processing and the sharpness enhancement processing described above should preferably be employed.

With the second image processing method and the second image processing apparatus in accordance with the present invention, each of the sharpness enhancement image processing and the graininess suppression image processing is carried out on the original image signal, and the operation processing is carried out on the image signal components of the two image signals having been obtained from the sharpness enhancement image processing and the graininess suppression image processing, which image signal components represent corresponding pixels in the two images represented by the two image signals. In this manner, the processed image signal is obtained. Therefore, the graininess suppression and the sharpness enhancement for the image can be simultaneously achieved more efficiently than with the conventional various methods or apparatuses. Also, before the operation processing is carried out, a calculation is made to find the difference between the image signal components of the graininess suppression processing image signal and the original image signal, which image signal components represent corresponding pixels in the two images represented by the graininess suppression processing image signal and the original image signal, and the calculated difference and the predetermined threshold value are compared with each other. With respect to pixels, which have been found, as a result of the comparison, to be associated with the difference larger than the predetermined threshold value, i.e. with respect to the pixels at which the degree of graininess suppression is high, the processing containing the aforesaid graininess suppression processing is not carried out, and the original image signal, an enhancement processing signal, which is obtained by carrying out enhancement processing on the original image signal, or the sharpness enhancement processing image signal is taken as the processed image signal. Therefore, the problems can be prevented from occurring in that, for example, the image area, which is not to be subjected to graininess suppression, such as a catch lights area, which is reflected in the pupil of the eye of a human body and is considered to be essential to portraits, is subjected, by mistake, to graininess suppression with the processing containing the aforesaid graininess suppression processing.

With the second image processing method and the second image processing apparatus in accordance with the present invention, wherein the operation processing defined with Formula (1) is employed, the weighted mean value of the graininess suppression processing image signal, in which graininess has been suppressed by the graininess suppression image processing, and the sharpness enhancement processing image signal, in which sharpness has been enhanced by the sharpness enhancement image processing, is calculated. In this manner, sharpness can be enhanced, while graininess is being suppressed.

With the second image processing method and the second image processing apparatus in accordance with the present invention, wherein the operation processing defined with Formula (2) is employed, the value, which is obtained from the weighting addition of the difference between the graininess suppression processing image signal and the original image signal and the difference between the sharpness enhancement processing image signal and the original image signal through weighting with the respective differences, is taken as the value of the processed image signal. Therefore, with respect to the image signal component representing a picture element corresponding to a flat image density area (i.e., an image area having little change in image density or luminance), at which graininess is more perceptible than sharpness is, the rate of contribution of the graininess suppression processing becomes high. Also, with respect to the image signal component representing a picture element corresponding to an image edge area (i.e., an image area having a sharp change in image density or luminance), at which sharpness is more perceptible than graininess is, the rate of contribution of sharpness enhancement processing becomes high. Accordingly, graininess can be suppressed such that the image edge area may not become dull.

As the graininess suppression image processing and the sharpness enhancement image processing, there should preferably be employed a combination of the graininess suppression processing, which utilizes the morphology operation, and the sharpness enhancement processing (disclosed in U.S. Pat. No. 5,739,922, wherein the enhancement and suppression processing is carried out such that the high frequency components of the image may be enhanced and the middle frequency components of the image may be suppressed, and wherein the high frequency components and the middle frequency components, which have been obtained from the enhancement and suppression processing, and the low frequency components are combined with one another. In such cases, the effects described below can be obtained.

Specifically, in particular, in cases where the operation processing defined with Formula (2) is employed, if graininess suppression has not been carried out on a sharpness enhancement area, and if sharpness enhancement is carried out extremely, graininess will also be enhanced, and the difference with respect to the original image signal will become larger than the difference between the graininess suppression processing image signal and the original image signal, and consequently graininess suppression will not be effected. Therefore, in cases where Formula (2) is employed, the sharpness enhancement processing disclosed in U.S. Pat. No. 5,739,922, in which the effects of graininess suppression can be obtained to a certain extent also with the sharpness enhancement processing, should preferably be employed.

With the third and fourth image processing methods and the third and fourth image processing apparatuses in accordance with the present invention, each of the opening processing and the closing processing in accordance with the morphology operation is carried out on the original image signal. The opening processing image signal, in which a convex image density change area (hereinbelow referred to as the positive noise or positive graininess) has been suppressed, is obtained from the opening processing. Also, the closing processing image signal, in which a concave image density change area (hereinbelow referred to as the negative noise or negative graininess) has been suppressed, is obtained from the closing processing. The operation processing is then carried out on the image signal components of the two image signals having been obtained from the opening processing and the closing processing, which image signal components represent corresponding pixels in the two images represented by the two image signals, and the processed image signal (in this case, the graininess suppression processing image signal) is thereby obtained. Therefore, positive noise and negative noise contained in the original image can be suppressed accurately.

Also, with the third and fourth image processing methods and the third and fourth image processing apparatuses in accordance with the present invention, wherein the details of the operation processing vary for the pixels, instead of being set to be common to all of the pixels, noise can be suppressed appropriately in accordance with the details of structure patterns embedded in the image. Therefore, graininess can be suppressed more accurately, and the degree of visual graininess suppression can be kept higher than with conventional processing technique in which the mean value of the opening processing image signal and the closing processing image signal is employed for every picture element (i.e., the technique described in "Detail-Preserving Smoothing with Morphology and Fuzzy Reasoning," Journal of Electronic Imaging, Vol. 5(3),pp. 396–401, Jul. 1996). Also, graininess can be suppressed with the technique simpler than a conventional technique in which a large number of reference tables are utilized (i.e., the technique referred to as the "Tsukasamoto's Fuzzy Models" and reported in the literature described above, wherein the difference between a closing processing image signal and an opening processing image signal is compared with a certain table, the corresponding area is judged as being grainy in cases where the difference is larger than a certain threshold value, the corresponding area is judged as being not grainy and being a fine structure pattern in the image in cases where the difference is smaller than the threshold value, and the area having been judged as being grainy is processed).

With the third image processing method and the third image processing apparatus in accordance with the present invention, wherein the operation processing defined with Formula (3) is employed, as for a picture element representing negative noise, which is not suppressed by the opening processing (i.e., the picture element, at which the value of the opening processing image signal is equal to the value of the original image signal), the value of the closing processing image signal is taken as the value of the processed image signal. Therefore, as for such a picture element, the processed image signal is obtained wherein negative noise has been suppressed. As for a picture element representing positive noise, which is not suppressed by the closing processing (i.e., the picture element, at which the value of the closing processing image signal is equal to the value of the original image signal), the value of the opening processing image signal is taken as the value of the processed image signal. Therefore, as for such a picture element, the processed image signal is obtained wherein positive noise has been suppressed. Accordingly, both the positive noise and the negative noise can be suppressed. As for a picture element, at which the value of the opening processing image signal and the value of the closing processing image signal are not equal to the value of the original image signal, the weighted mean value of the opening processing image signal and the closing processing image signal is taken as the value of the processed image signal. In this manner, positive noise and negative noise can be suppressed appropriately. In particular, in cases where the weighting ratio in the calculation of the weighted mean value is set to be 5:5, optimum graininess suppression can be achieved.

With the fourth image processing method and the fourth image processing apparatus in accordance with the present invention, wherein the operation processing defined with Formula (4) is employed, as for a picture element representing negative noise, which is not suppressed by the opening processing (i.e., the picture element, at which the value of the opening processing image signal is equal to the value of the original image signal), the value of the closing processing image signal is taken as the value of the processed image signal. Therefore, as for such a picture element, the processed image signal is obtained wherein negative noise has been suppressed. As for a picture element representing positive noise, which is not suppressed by the closing processing (i.e., the picture element, at which the value of the closing processing image signal is equal to the value of the original image signal), the value of the opening processing image signal is taken as the value of the processed image signal. Therefore, as for such a picture element, the processed image signal is obtained wherein positive noise has been suppressed. Accordingly, both the positive noise and the negative noise can be suppressed. As for a picture element, at which the value of the opening processing image signal and the value of the closing processing image signal are not equal to the value of the original image signal, the addition through weighting with the difference between the opening processing image signal fopn or the closing processing image signal fcls, whichever has a larger difference with respect to the original image signal fin, and the original image signal fin is carried out, and the value obtained from the weighting addition is taken as the value of the processed image signal. In this manner, positive noise and negative noise can be suppressed appropriately.

BRIEF DESCRIPTION OF THE DRAWINGS

FIG. 12A is a graph showing a distribution of an original image signal Rin, FIG. 12B is an enlarged view showing high frequency noise (an area A) in the original image signal Rin shown in FIG. 12A, FIG. 12C is an enlarged view showing an area of an opening processing image signal Ropn obtained from the original image signal Rin, which area corresponds to the area A, FIG. 12D is an enlarged view showing an area of a closing processing image signal Rcls obtained from the original image signal Rin, which area corresponds to the area A, FIG. 12E is an enlarged view showing an area of a processed image signal Rout, which area corresponds to the area A.

DESCRIPTION OF THE PREFERRED EMBODIMENTS

The present invention will hereinbelow be described in further detail with reference to the accompanying drawings.

Figure 1:
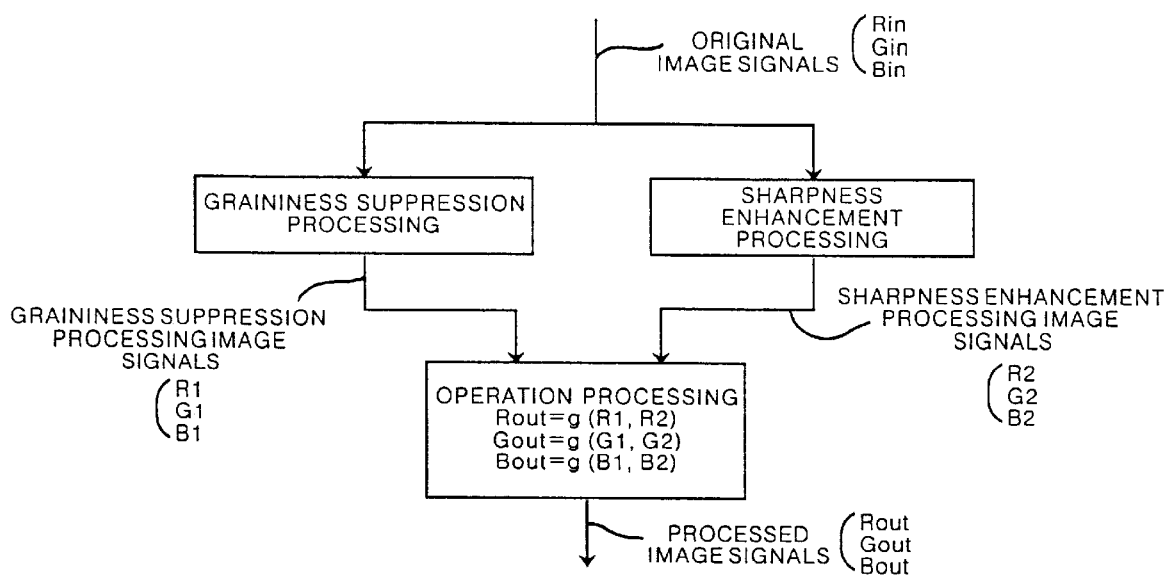
FIG. 1 is a flow chart showing how processing is carried out in a first embodiment of the image processing method in accordance with the present invention.
Figure 2:
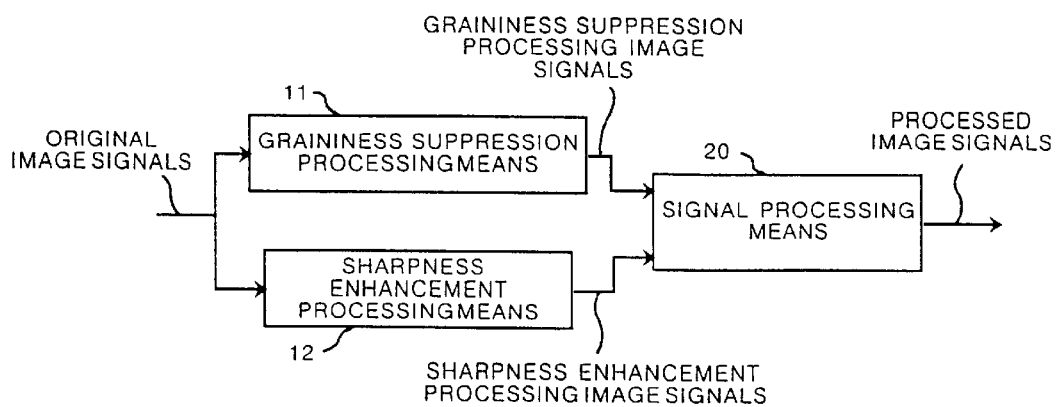
FIG. 2 is a block diagram showing an image processing apparatus for carrying out the first embodiment of FIG. 1.

FIG. 1 is a flow chart showing how processing is carried out in a first embodiment of the image processing method in accordance with the present invention. FIG. 2 is a block diagram showing an image processing apparatus for carrying out the first embodiment of FIG. 1.

With reference to FIGS. 1 and 2, the image processing apparatus comprises a graininess suppression processing means 11 for receiving RGB image signals Rin, Gin, and Bin, which represent a color image and have been acquired from photographing with a digital still camera or have been photoelectrically detected from a color photograph print or color film, and carrying out graininess suppression image processing on each of the RGB image signals Rin, Gin, and Bin. Graininess suppression processing image signals R1, G1, and B1 are obtained from the graininess suppression processing carried out by the graininess suppression processing means 11. The image processing apparatus also comprises a sharpness enhancement processing means 12 for carrying out sharpness enhancement image processing on each of the RGB image signals Rin, Gin, and Bin. Sharpness enhancement processing image signals R2, G2, and B2 are obtained from the sharpness enhancement processing carried out by the sharpness enhancement processing means 12. The image processing apparatus further comprises a signal processing means 20 for carrying out processing for obtaining processed image signals Rout, Gout, and Bout in accordance with the graininess suppression processing image signals R1, G1, and B1 and the sharpness enhancement processing image signals R2, G2, and B2. The processed image signal Rout is obtained with operation processing g(R1, R2) carried out on image signal components of the graininess suppression processing image signal R1 and the sharpness enhancement processing image signal R2, which image signal components represent corresponding pixels in two images represented by the graininess suppression processing image signal R1 and the sharpness enhancement processing image signal R2. The processed image signal Gout is obtained with operation processing g(G1, G2) carried out on image signal components of the graininess suppression processing image signal G1 and the sharpness enhancement processing image signal G2, which image signal components represent corresponding pixels in two images represented by the graininess suppression processing image signal G1 and the sharpness enhancement processing image signal G2. Also, the processed image signal Bout is obtained with operation processing g(B1, B2) carried out on image signal components of the graininess suppression processing image signal B1 and the sharpness enhancement processing image signal B2, which image signal components represent corresponding pixels in two images represented by the graininess suppression processing image signal B1 and the sharpness enhancement processing image signal B2.

By way of example, as each operation processing g carried out by the signal processing means 20, the weighting addition processing represented by Formula (1) shown below may be employed.

$$fout = w1 \cdot f1 + w2 \cdot f2 \qquad (1)$$

wherein w1 and w2 represent weight factors, w1+w2=1 (0<w1<1, 0<w2<1), fout represents the processed image signal, f1 represents the graininess suppression processing image signal, and f2 represents the sharpness enhancement processing image signal.

Specifically, g(f1, f2)=w1·f1+w2·f2.

The values of the weight factors w1 and w2 are set to vary for different pixels and are determined in accordance with, for example, the original image signals Rin, Gin, and Bin.

Specifically, as for a picture element corresponding to a flat image density area (i.e., an image area having little change in image density or luminance), at which graininess is more perceptible than sharpness is, the value of the weight factor w1 for the graininess suppression processing image signal is set to be larger than the value of the weight factor w2 for the sharpness enhancement processing image signal. Also, as for a picture element corresponding to an image edge area (i.e., an image area having a sharp change in image density or luminance), at which sharpness is more perceptible than graininess is, the value of the weight factor w2 for the sharpness enhancement processing image signal is set to be larger than the value of the weight factor w1 for the graininess suppression processing image signal.

In this embodiment, median filter processing is employed as the graininess suppression processing carried out by the graininess suppression processing means 11, and unsharp masking (USM) processing is employed as the sharpness enhancement processing carried out by the sharpness enhancement processing means 12.

Figure 3A:
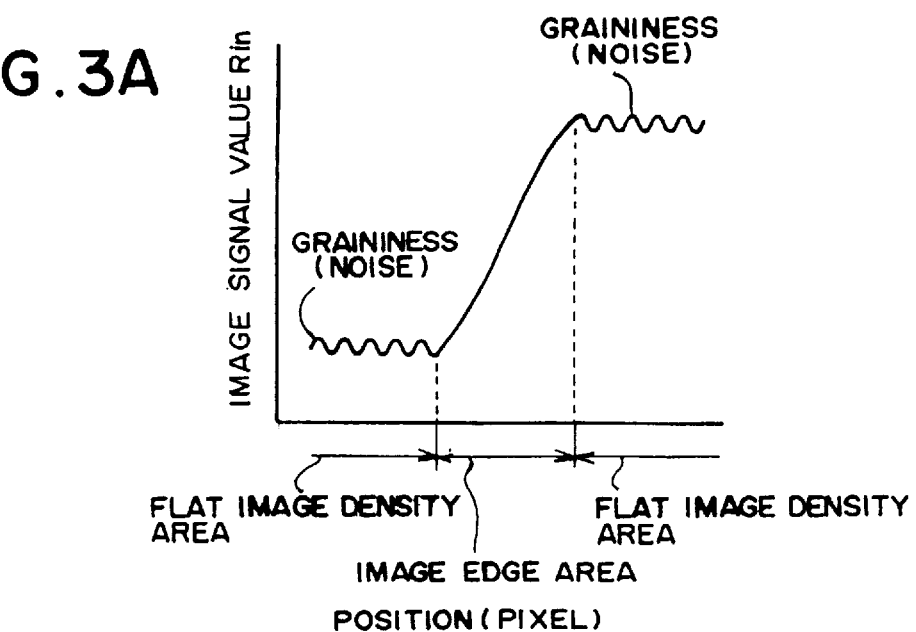
FIG. 3A is a graph showing a distribution of an original image signal Rin.

How this embodiment of the image processing apparatus operates will be described hereinbelow by taking the R image signal Rin, which is one of the original image signals and has the distribution shown in FIG. 3A, as an example.

Firstly, each of the RGB image signals Rin, Gin, and Bin, which represent the color image, is fed from the digital still camera, or the like, into the graininess suppression processing means 11 and the sharpness enhancement processing means 12. As described above, the image signal Rin has the distribution shown in FIG. 3A. Each of the other image signals Gin and Bin also has a predetermined distribution (not shown).

The original image signal Rin represents an image edge area, at which the image density changes comparatively largely, and a flat image density area, at which the change in image density is comparatively small. High frequency noise is superposed upon the image density distribution. The high frequency noise is visually perceptible particularly at the flat image density area.

Figure 3B:
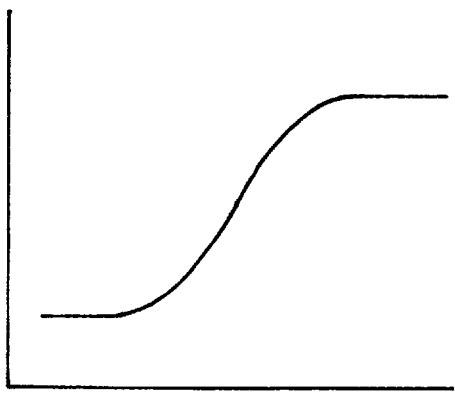
FIG. 3B is a graph showing a distribution of a graininess suppression processing image signal R1, which is obtained from the original image signal Rin.

The graininess suppression processing means 11 carries out the median filter processing on each of the received original image signals Rin, Gin, and Bin and thereby calculates the graininess suppression processing image signals R1, G1, and B1. FIG. 3B shows the distribution of the graininess suppression processing image signal R1, which has been obtained by carrying out the graininess suppression processing on the original image signal Rin.

Figure 3C:
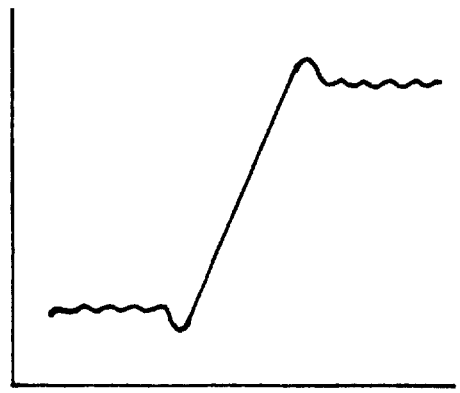
FIG. 3C is a graph showing a distribution of a sharpness enhancement processing image signal R2, which is obtained from the original image signal Rin.

The sharpness enhancement processing means 12 carries out the USM processing on each of the received original image signals Rin, Gin, and Bin and thereby calculates the sharpness enhancement processing image signals R2, G2, and B2. FIG. 3C shows the distribution of the sharpness enhancement processing image signal R2, which has been obtained by carrying out the sharpness enhancement processing on the original image signal Rin.

As illustrated in FIG. 3B, in the graininess suppression processing image signal R1, graininess in the original image signal Rin has been suppressed. The graininess suppression processing image signal R1 is thus a smoothed signal. Also, as illustrated in FIG. 3C, in the sharpness enhancement processing image signal R2, the image density change areas in the original image signal Rin have been enhanced.

In each of the other graininess suppression processing image signals G1 and B1, as in the graininess suppression processing image signal R1, graininess has been suppressed and the signal has been smoothed. In each of the other sharpness enhancement processing image signals G2 and B2, as in the sharpness enhancement processing image signal R2, the image density change areas have been enhanced.

The graininess suppression processing image signals R1, G1, and B1, which have been calculated by the graininess suppression processing means 11, and the sharpness enhancement processing image signals R2, G2, B2, which have been calculated by the sharpness enhancement processing means 12, are fed into the signal processing means 20.

The signal processing means 20 carries out the weighting addition processing in accordance with Formula (1) shown above and on the received graininess suppression processing image signal and the received sharpness enhancement processing image signal, which correspond to each of the R, G, and B colors. The weighting addition processing is carried out on the image signal components of the graininess suppression processing image signal and the sharpness enhancement processing image signal corresponding to each color, which image signal components represent corresponding pixels in the two images represented by the graininess suppression processing image signal and the sharpness enhancement processing image signal. In this manner, the processed image signal is calculated with respect to each color. At this time, as described above, in Formula (1), as for a picture element corresponding to a flat image density area, at which graininess is more perceptible than sharpness is, the value of the weight factor w1 for the graininess suppression processing image signal is set to be larger than the value of the weight factor w2 for the sharpness enhancement processing image signal. Also, as for a picture element corresponding to an image edge area, at which sharpness is more perceptible than graininess is, the value of the weight factor w2 for the sharpness enhancement processing image signal is set to be larger than the value of the weight factor w1 for the graininess suppression processing image signal.

Figure 3D:
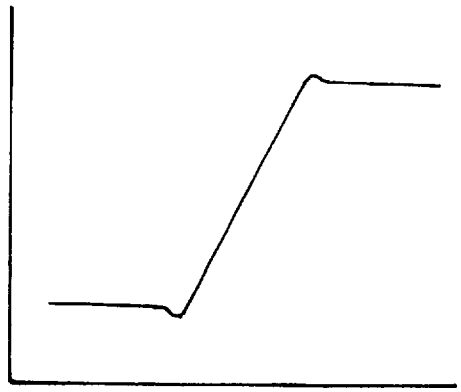
FIG. 3D is a graph showing a distribution of a processed image signal Rout.
Figure 4A:
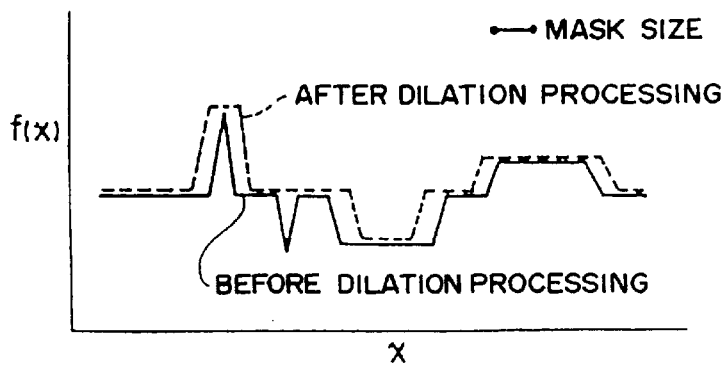
FIG. 4A is a graph showing how a dilation processing, which is one of fundamental morphology operations, is carried out.
Figure 4B:
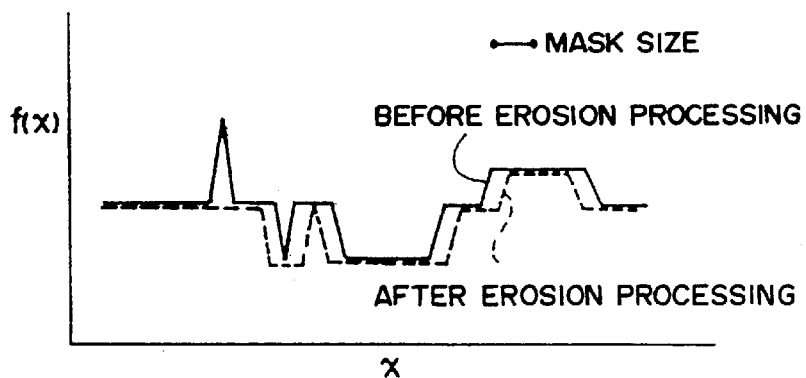
FIG. 4B is a graph showing how an erosion processing, which is one of fundamental morphology operations, is carried out.
Figure 4C:
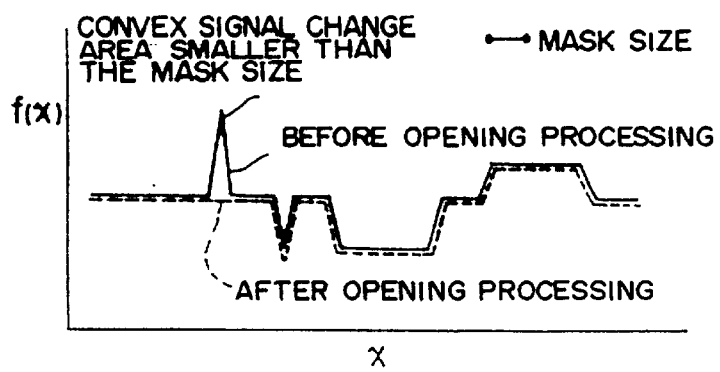
FIG. 4C is a graph showing how an opening processing, which is one of fundamental morphology operations, is carried out.
Figure 4D:
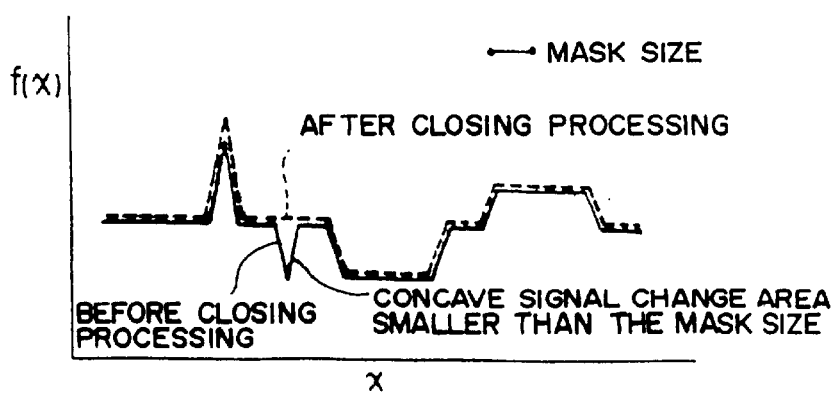
FIG. 4D is a graph showing how a closing processing, which is one of fundamental morphology operations, is carried out.
Figure 5:
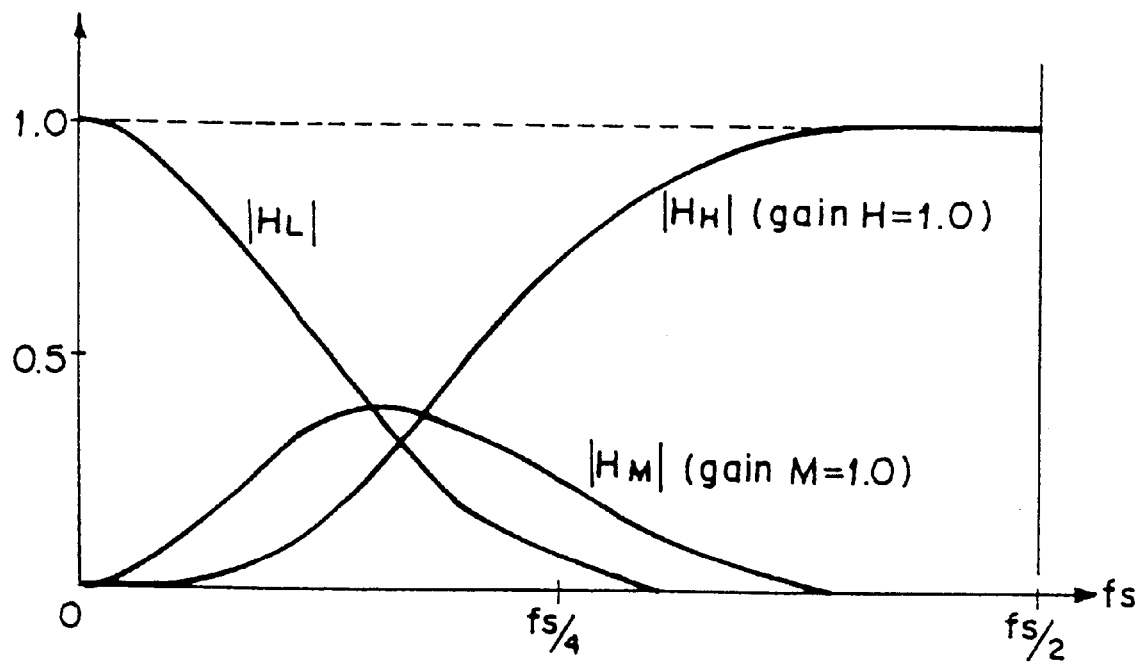
FIG. 5 is a graph showing how low, middle, and high frequency components are distributed.

FIG. 3D shows the distribution of the processed image signal Rout, which is obtained by carrying out the weighting addition processing in accordance with Formula (1) and on the graininess suppression processing image signal R1, which is shown in FIG. 3B, and the sharpness enhancement processing image signal R2, which is shown in FIG. 3C.

As illustrated in FIG. 3D, with respect to the original image signal Rin shown in FIG. 3A, the processed image signal Rout has the characteristics described below. Specifically, at the flat image density area, at which graininess is comparatively perceptible, graininess has been suppressed. Also, at the image edge area, at which sharpness is comparatively perceptible, sharpness has been enhanced. Therefore, the graininess suppression and the sharpness enhancement can be simultaneously achieved efficiently.

As in the processed image signal Rout, each of the other processed image signals Gout and Bout can be obtained such that the graininess suppression and the sharpness enhancement can be achieved efficiently.

As described above, with this embodiment of the image processing apparatus, each of the graininess suppression processing and the sharpness enhancement processing is carried out on the given original image signal. The graininess suppression processing image signal, in which graininess has been suppressed, and the sharpness enhancement processing image signal, in which sharpness has been enhanced, are thereby obtained. Also, the operation processing is carried out on the image signal components of the graininess suppression processing image signal and the sharpness enhancement processing image signal, which image signal components represent corresponding pixels in the two images represented by the two image signals. In this manner, the processed image signal is obtained. Therefore, graininess in the original image can be suppressed efficiently, and sharpness can be enhanced efficiently.

In the first embodiment described above, as each operation processing g carried out by the signal processing means 20, the weighting addition processing represented by Formula (1) is employed. However, the image processing method and the image processing apparatus in accordance with the present invention are not limited to the use of the operation processing represented by Formula (1), and one of various other appropriate operation processings may be employed.

For example, in a second embodiment of the image processing apparatus in accordance with the present invention, the operation processing represented by Formula (2) shown below may be employed.

$$f\text{out}=\{|f1-f\text{in}|(f1-f\text{in})+|f2-f\text{in}|(f2-f\text{in})\}/\{|f1-f\text{in}|+|f2-f\text{in}|\}+f\text{in} \quad (2)$$

wherein fin represents the original image signal, fout represents the processed image signal, f1 represents the graininess suppression processing image signal, and f2 represents the sharpness enhancement processing image signal.

Specifically, with the operation processing represented by Formula (2), as for a picture element, at which the value of the graininess suppression processing image signal R1 is equal to the value of the original image signal Rin, the value of the sharpness enhancement processing image signal R2 is taken as the value of the processed image signal Rout. As for a picture element, at which the value of the sharpness enhancement processing image signal R2 is equal to the value of the original image signal Rin, the value of the graininess suppression processing image signal R1 is taken as the value of the processed image signal Rout. As for a picture element, at which the value of the graininess suppression processing image signal R1 and the value of the sharpness enhancement processing image signal R2 are not equal to the value of the original image signal Rin, the addition through weighting with the difference (|R1−Rin| or |R2−Rin|) between the graininess suppression processing image signal R1 or the sharpness enhancement processing image signal R2, whichever has a larger difference (|R1−Rin| or |R2−Rin|) with respect to the original image signal Rin, and the original image signal Rin is carried out, and the value obtained from the weighting addition is taken as the value of the processed image signal Rout. As for each of the other G and B color image signals, processing is carried out in the same manner.

With the second embodiment, wherein the operation processing represented by Formula (2) is employed, as in the first embodiment, wherein the operation processing represented by Formula (1) is employed, graininess in the original image can be suppressed efficiently, and sharpness can be enhanced efficiently.

In the second embodiment, wherein the operation processing represented by Formula (2) is employed, there should preferably be employed a combination of the graininess suppression processing, which utilizes the morphology operation, and the sharpness enhancement processing (disclosed in U.S. Pat. No. 5,739,922, wherein the enhancement and suppression processing is carried out such that the high frequency components of the image may be enhanced and the middle frequency components of the image may be suppressed, and wherein the high frequency components and the middle frequency components, which have been obtained from the enhancement and suppression processing, and the low frequency components are combined with one another.

Figure 6:
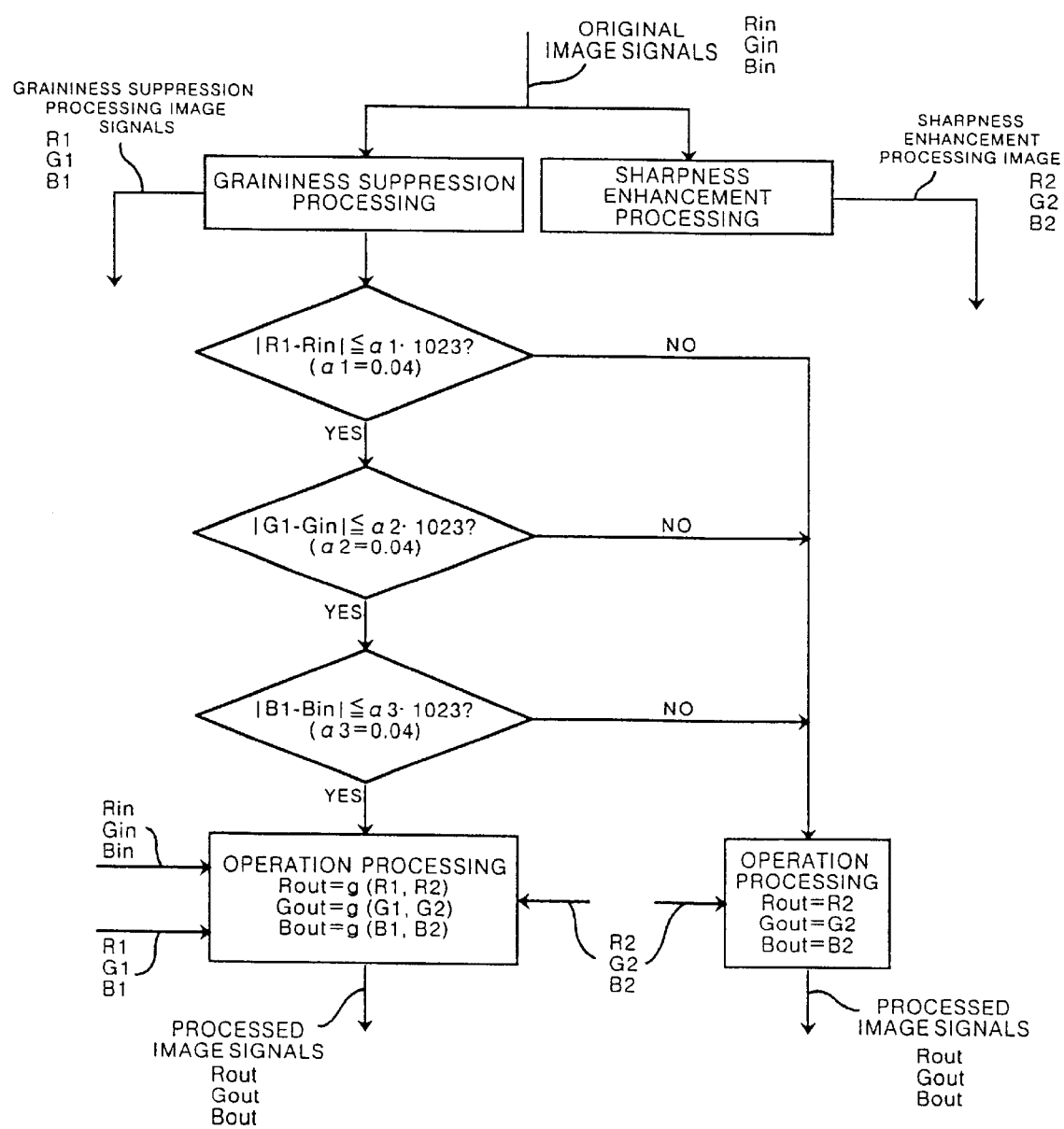
FIG. 6 is a flow chart showing how processing is carried out in a third embodiment of the image processing method in accordance with the present invention.
Figure 7:
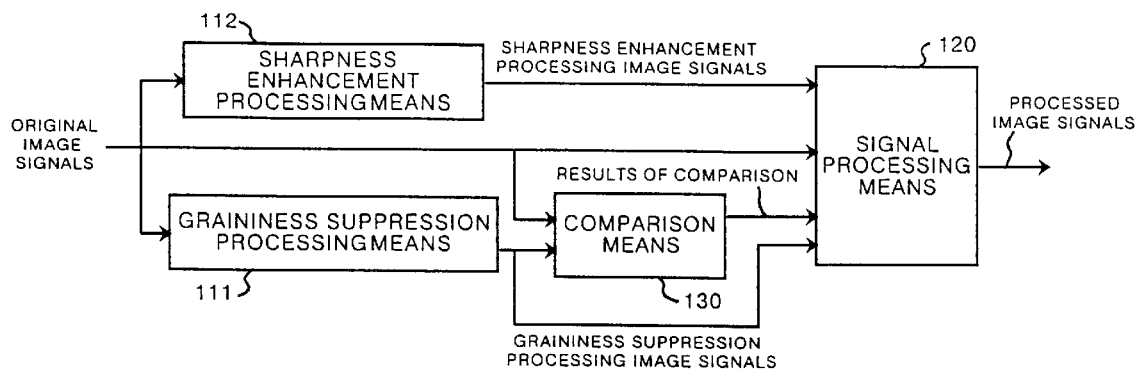
FIG. 7 is a block diagram showing an image processing apparatus for carrying out the third embodiment of FIG. 6.

FIG. 6 is a flow chart showing how processing is carried out in a third embodiment of the image processing method in accordance with the present invention. FIG. 7 is a block diagram showing an image processing apparatus for carrying out the third embodiment of FIG. 6.

With reference to FIGS. 6 and 7, the image processing apparatus comprises a graininess suppression processing means 111 for receiving RGB image signals Rin, Gin, and Bin (each having 1,024 gradation levels), which represent a color image and have been acquired from photographing with a digital still camera or have been photoelectrically detected with a scanner, or the like, from a color photograph print or color film, and carrying out graininess suppression image processing on each of the RGB image signals Rin, Gin, and Bin. Graininess suppression processing image signals R1, G1, and B1 are obtained from the graininess suppression processing carried out by the graininess suppression processing means 111. The image processing apparatus also comprises a sharpness enhancement processing means 112 for carrying out sharpness enhancement image processing on each of the RGB image signals Rin, Gin, and Bin. Sharpness enhancement processing image signals R2, G2, and B2 are obtained from the sharpness enhancement processing carried out by the sharpness enhancement processing means 112. The image processing apparatus further comprises a comparison means 130. With respect to the R signal, the comparison means 130 calculates a difference |R1−Rin| between image signal components of the graininess suppression processing image signal R1 and the original image signal Rin, which image signal components represent corresponding pixels in two images represented by the graininess suppression processing image signal R1 and the original image signal Rin. Also, with respect to the G and B signals, the comparison means 130 calculates differences |G1−Gin|, |B1−Bin| between image signal components of the graininess suppression processing image signals G1, B1 and the corresponding original image signals Gin, Bin, which image signal components represent corresponding pixels in the images represented by the graininess suppression processing image signals G1, B1 and the original image signals Gin, Bin. The comparison means 130 further compares each of the calculated differences and a corresponding threshold value, which is among threshold values $\alpha 1 \cdot 1{,}023$, $\alpha 2 \cdot 1{,}023$, and $\alpha 3 \cdot 1{,}023$ having been set previously for the R, G, and B signals, with each other. The comparison means 130 feeds out information, which represents the results of the comparison. The image processing apparatus still further comprises a signal processing means 120 for carrying out predetermined operation processing in accordance with the results of the comparison made by the comparison means 130.

Each of the threshold values $\alpha 1 \cdot 1{,}023$, $\alpha 2 \cdot 1{,}023$, and $\alpha 3 \cdot 1{,}023$, which have been set previously and stored in the comparison means 130, is the value corresponding to the number of gradation levels of each of the original image signals Rin, Gin, and Bin. In this embodiment, the coefficients $\alpha 1$, $\alpha 2$, and $\alpha 3$ are set to be 0.04 (i.e., 4% of the number of gradation levels). The coefficients $\alpha 1$, $\alpha 2$, and $\alpha 3$ need not necessarily take the same value and may take values varying for R, G, and B signals in accordance with the kind of the image represented by the original image signals, or the like. Also, the values of the coefficients $\alpha 1$, $\alpha 2$, and $\alpha 3$ are not limited to 0.04. However, ordinarily, the coefficients $\alpha 1$, $\alpha 2$, and $\alpha 3$ should preferably take values falling within the range of 0.01 to 0.20, and should more preferably take values falling within the range of 0.02 to 0.10.

With the signal processing means 120, the predetermined operation processing is carried out in the manner described below. Specifically, with respect to pixels, which have been found, as a result of the comparison made by the comparison means 130 with respect to all of the R, G, and B colors, to be associated with the differences smaller than or equal to the corresponding threshold values, first operation processing is carried out. With the first operation processing, processing is carried out for obtaining processed image signals Rout, Gout, and Bout in accordance with the graininess suppression processing image signals R1, G1, and B1 and the sharpness enhancement processing image signals R2, G2, and B2. The processed image signal Rout is obtained with operation processing g(R1, R2) carried out on image signal components of the graininess suppression processing image signal R1 and the sharpness enhancement processing image signal R2, which image signal components represent corresponding pixels in two images represented by the graininess suppression processing image signal R1 and the sharpness enhancement processing image signal R2. The processed image signal Gout is obtained with operation processing g(G1, G2) carried out on image signal components of the graininess suppression processing image signal G1 and the sharpness enhancement processing image signal G2, which image signal components represent corresponding pixels in two images represented by the graininess suppression processing image signal G1 and the sharpness enhancement processing image signal G2. Also, the processed image signal Bout is obtained with operation processing g(B1, B2) carried out on image signal components of the graininess suppression processing image signal B1 and the sharpness enhancement processing image signal B2, which image signal components represent corresponding pixels in two images represented by the graininess suppression processing image signal B1 and the sharpness enhancement processing image signal B2. With respect to pixels, which have been found, as a result of the comparison with respect to the R color, the G color, or the B color, to be associated with the difference larger than the threshold value, second operation processing is carried out. With the second operation processing, the sharpness enhancement processing image signals R2, G2, and B2 are taken, respectively, as the processed image signals Rout, Gout, and Bout.

By way of example, as the first operation processing g carried out by the signal processing means 120, the weighting addition processing represented by Formula (1) shown below may be employed.

$$f\text{out} = w1 \cdot f1 + w2 \cdot f2 \quad (1)$$

wherein w1 and w2 represent weight factors, $w1+w2=1$ ($0<w1<1$, $0<w2<1$), fout represents the processed image signal, f1 represents the graininess suppression processing image signal, and f2 represents the sharpness enhancement processing image signal.

Specifically, $g(f1, f2) = w1 \cdot f1 + w2 \cdot f2$.

The values of the weight factors w1 and w2 are set to vary for different pixels and are determined in accordance with, for example, the original image signals Rin, Gin, and Bin.

Specifically, as for a picture element corresponding to a flat image density area (i.e., an image area having little change in image density or luminance), at which graininess is more perceptible than sharpness is, the value of the weight factor w1 for the graininess suppression processing image signal f1 is set to be larger than the value of the weight factor w2 for the sharpness enhancement processing image signal f2. Also, as for a picture element corresponding to an image edge area (i.e., an image area having a sharp change in image density or luminance), at which sharpness is more perceptible than graininess is, the value of the weight factor w2 for the sharpness enhancement processing image signal f2 is set to be larger than the value of the weight factor w1 for the graininess suppression processing image signal f1.

In the third embodiment, the median filter processing is employed as the graininess suppression processing carried out by the graininess suppression processing means 111, and the unsharp masking (USM) processing is employed as the sharpness enhancement processing carried out by the sharpness enhancement processing means 112.

How the third embodiment of the image processing apparatus operates will be described hereinbelow by taking the R image signal Rin, which is among the R, G, and B signals, as an example.

Firstly, each of the RGB image signals Rin, Gin, and Bin, which represent the color image, is fed from the digital still camera, or the like, into the graininess suppression processing means 111 and the sharpness enhancement processing means 112. The image signal Rin has the distribution shown in FIG. 8A. Each of the other image signals Gin and Bin also has a predetermined distribution (not shown).

The original image signal Rin represents an image edge area, at which the image density changes comparatively largely, and a flat image density area, at which the change in image density is comparatively small. High frequency noise is superposed upon the image density distribution. The high frequency noise is visually perceptible particularly at the flat image density area. Also, at the flat image density area (e.g., the pattern of the pupil of the eye of a human body), a catch lights area, which is reflected in the pupil of the eye, is embedded.

Figure 8C:
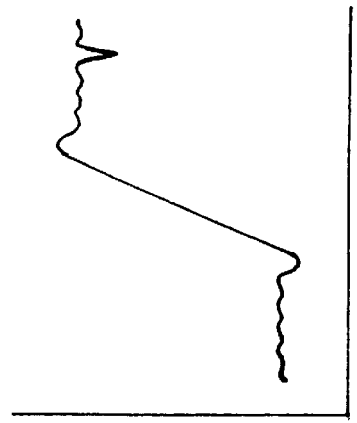
FIG. 8C is a graph showing a distribution of a sharpness enhancement processing image signal R2, which is obtained from the original image signal Rin.
Figure 8B:
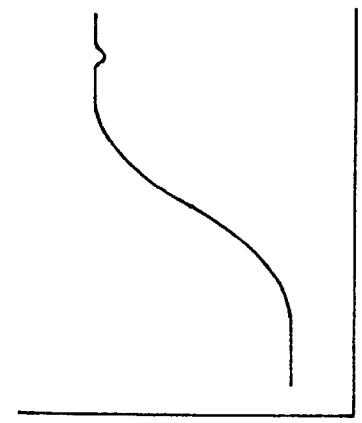
FIG. 8B is a graph showing a distribution of a graininess suppression processing image signal R1, which is obtained from the original image signal Rin.

The graininess suppression processing means 111 carries out the median filter processing on each of the received original image signals Rin, Gin, and Bin and thereby calculates the graininess suppression processing image signals R1, G1, and B1. FIG. 8B shows the distribution of the graininess suppression processing image signal R1, which has been obtained by carrying out the graininess suppression processing on the original image signal Rin.

The sharpness enhancement processing means 112 carries out the USM processing on each of the received original image signals Rin, Gin, and Bin and thereby calculates the sharpness enhancement processing image signals R2, G2, and B2. FIG. 8C shows the distribution of the sharpness enhancement processing image signal R2, which has been obtained by carrying out the sharpness enhancement processing on the original image signal Rin.

As illustrated in FIG. 8B, in the graininess suppression processing image signal R1, graininess in the original image signal Rin has been suppressed. The graininess suppression processing image signal R1 is thus a smoothed signal. Also, as illustrated in FIG. 8C, in the sharpness enhancement processing image signal R2, the image density change areas in the original image signal Rin have been enhanced.

In each of the other graininess suppression processing image signals G1 and B1, as in the graininess suppression processing image signal R1, graininess has been suppressed and the signal has been smoothed. In each of the other sharpness enhancement processing image signals G2 and B2, as in the sharpness enhancement processing image signal R2, the image density change areas have been enhanced.

The graininess suppression processing image signals R1, G1, and B1, which have been calculated by the graininess suppression processing means 111, are fed into the comparison means 130 together with the original image signals Rin, Gin, and Bin.

With respect to the R signal, the comparison means 130 calculates the difference |R1−Rin| between the image signal components of the graininess suppression processing image signal R1 and the original image signal Rin, which image signal components represent corresponding pixels in the two images represented by the graininess suppression processing image signal R1 and the original image signal Rin. Also, with respect to the G and B signals, the comparison means 130 calculates the differences |G1−Gin|, |B1−Bin| between the image signal components of the graininess suppression processing image signals G1, B1 and the corresponding original image signals Gin, Bin, which image signal components represent corresponding pixels in the images represented by the graininess suppression processing image signals G1, B1 and the original image signals Gin, Bin. The comparison means 130 further compares each of the calculated differences |R1−Rin|, |G1−Gin|, |B1−Bin| and the corresponding threshold value, which is among the threshold values $\alpha 1 \cdot 1{,}023$ (for the R signal), $\alpha 2 \cdot 1{,}023$ (for the G signal), and $\alpha 3 \cdot 1{,}023$ (for the B signal) having been set previously for the R, G, and B signals, with each other. The comparison means 130 feeds the information, which represents the results of the comparison, into the signal processing means 120. At the grainy area shown in FIG. 8A, the values of the aforesaid differences are smaller than the threshold values. At the catch lights area shown in FIG. 8A, the values of the aforesaid differences are larger than the threshold values.

The signal processing means 120 carries out the first operation processing g or the second operation processing described above in accordance with the information representing the results of the comparison, which has been received from the comparison means 130.

In the cases of the first operation processing g, the signal processing means 120 carries out the weighting addition processing in accordance with Formula (1) shown above and on the received graininess suppression processing image signal and the received sharpness enhancement processing image signal, which correspond to each of the R, G, and B colors. The weighting addition processing is carried out on the image signal components of the graininess suppression processing image signal and the sharpness enhancement processing image signal corresponding to each color, which image signal components represent corresponding pixels in the two images represented by the graininess suppression processing image signal and the sharpness enhancement processing image signal. In this manner, the processed image signal is calculated with respect to each color. At this time, as described above, in Formula (1), as for a picture element corresponding to a flat image density area, at which graininess is more perceptible than sharpness is, the value of the weight factor w1 for the graininess suppression processing image signal is set to be larger than the value of the weight factor w2 for the sharpness enhancement processing image signal. Also, as for a picture element corresponding to an image edge area, at which sharpness is more perceptible than graininess is, the value of the weight factor w2 for the sharpness enhancement processing image signal is set to be larger than the value of the weight factor w1 for the graininess suppression processing image signal.

Figure 8A:
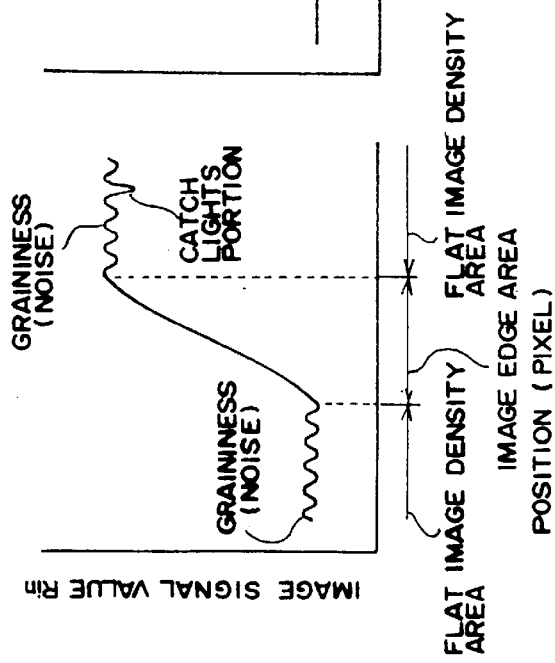
FIG. 8A is a graph showing a distribution of an original image signal Rin.
Figure 8F:
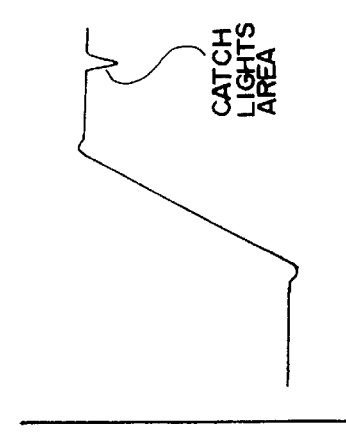
FIG. 8F is a graph showing a distribution of a processed image signal Rout, which is obtained ultimately.
Figure 8E:
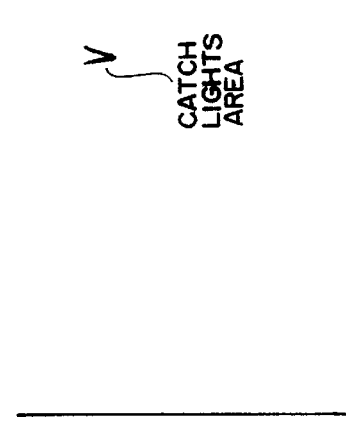
FIG. 8E is a graph showing the results of second operation processing.
Figure 8D:
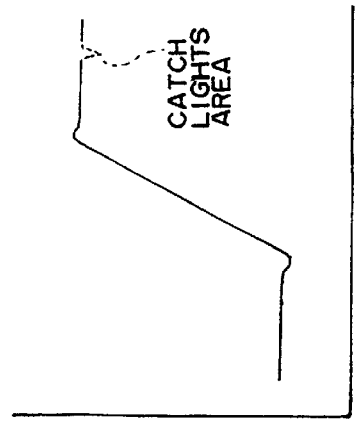
FIG. 8D is a graph showing the results of first operation processing.

FIG. 8D shows the distribution of the processed image signal Rout, which is obtained by carrying out the weighting addition processing in accordance with Formula (1) and on the graininess suppression processing image signal R1, which is shown in FIG. 8B, and the sharpness enhancement processing image signal R2, which is shown in FIG. 8C.

As illustrated in FIG. 8D, with respect to the original image signal Rin shown in FIG. 8A, the processed image signal Rout has the characteristics described below. Specifically, at the flat image density area, at which graininess is comparatively perceptible, graininess has been suppressed. Also, at the image edge area, at which sharpness is comparatively perceptible, sharpness has been enhanced. Therefore, the graininess suppression and the sharpness enhancement can be simultaneously achieved efficiently. As in the processed image signal Rout, each of the other processed image signals Gout and Bout can be obtained such that the graininess suppression and the sharpness enhancement can be achieved efficiently.

If the catch lights area, which is to be processed with the second operation processing in the manner described later, were processed with the first operation processing g, the results indicated by the broken line in FIG. 8D would be obtained. In FIG. 8D, the catch lights area is assumptively illustrated for comparison with the results of the second operation processing.

In the cases of the second operation processing, with respect to each of the R, G, and B colors, the signal processing means 120 feeds out the sharpness enhancement processing image signal as the processed image signal. Therefore, as illustrated in FIG. 8E, as for the area corresponding to the catch lights area, the sharpness enhancement processing image signal is fed out as the processed image signal.

As illustrated in FIG. 8F, the processed image signal, which has been obtained from the aforesaid first operation processing or the aforesaid second operation processing carried out with respect to each picture element, is fed out from the signal processing means 120.

As described above, with the third embodiment of the image processing apparatus, graininess in the original image can be suppressed efficiently, and sharpness can be enhanced efficiently. Also, with the threshold value processing carried out by the comparison means 130, the predetermined image area, such as the catch lights area, can be prevented from being subjected to the graininess suppression processing as in the grainy area (as indicated by the broken line in FIG. 8D) and can thereby be retained accurately in the image after being processed.

In the third embodiment of the image processing apparatus, as illustrated in FIG. 6, as the technique for changing over whether the signal processing means 120 should carry out the first operation processing or the second operation processing on the received signal, the RGB batch change-over technique is employed. With the RGB batch change-over technique, in accordance with the results of the comparison may by the comparison means 130 with respect to each of the R, G, and B color image signals, with respect to a picture element, at which the aforesaid difference is larger than the threshold value with respect to at least one of the R, G and B color image signals, the second operation processing is carried out with respect to all of the R, G, and B color image signals. Also, with respect to a picture element, at which the aforesaid difference is smaller than the threshold value with respect to all of the R, G and B color image signals, the first operation processing is carried out with respect to all of the R, G, and B color image signals. However, the image processing method and the image processing apparatus in accordance with the present invention are not limited to the use of the change-over technique wherein, with respect to a single picture element, the same processing is employed for all of the R, G, and B color image signals. It is also possible to employ a change-over technique for utilizing different operation processings for the R, G, and B color image signals such that, for example, the first operation processing may be utilized for the R signal, and the second operation processing may be utilized for the G signal and the B signal.

Figure 9:
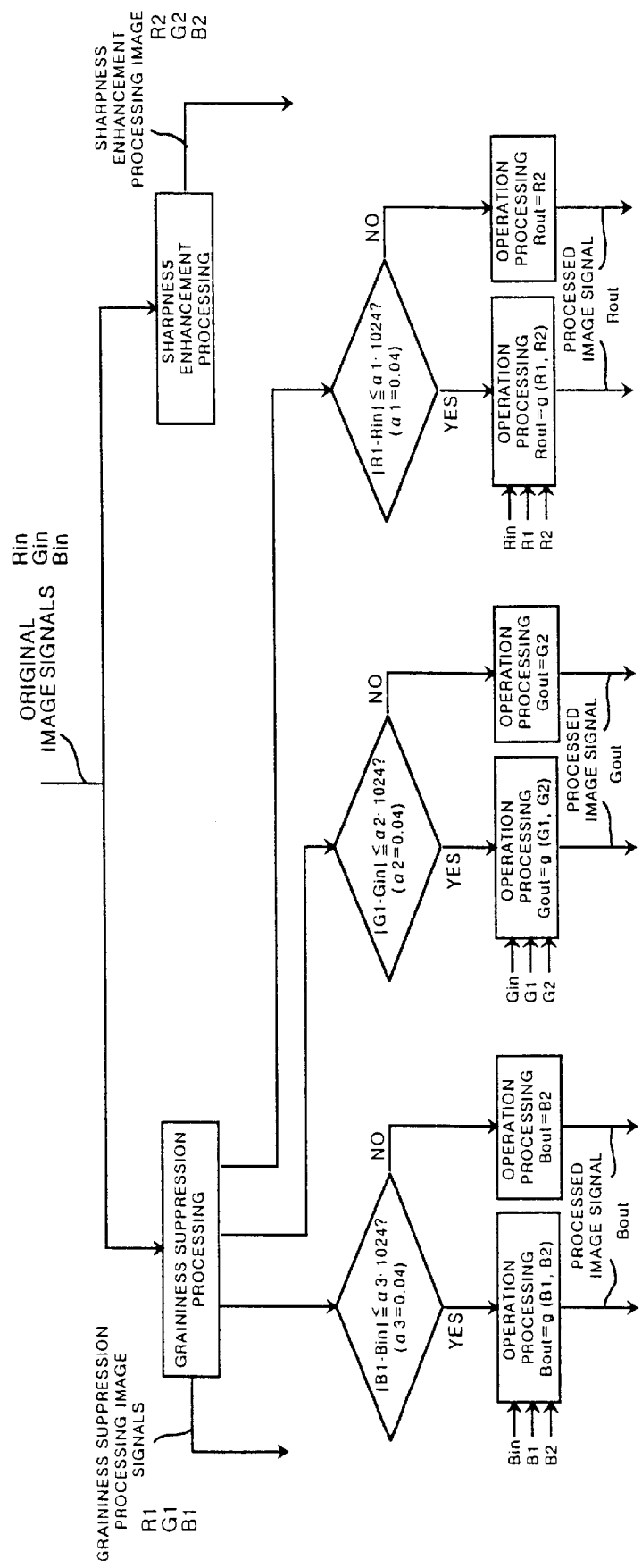
FIG. 9 is a flow chart showing how processing is carried out in a fourth embodiment of the image processing method in accordance with the present invention.

Specifically, as in a fourth embodiment shown in FIG. 9, in accordance with the results of the comparison may by the comparison means 130 with respect to each of the R, G, and B color image signals, the operation processing may be changed over to the first operation processing or the second operation processing with respect to each of the R, G, and B color image signals. In this manner, with respect to a single picture element, different operation processings can be carried out for the R, G, and B color image signals.

Also, in the third embodiment of the image processing apparatus, the image processing is carried out on the color image signals, and the graininess suppression processing, the sharpness enhancement processing, and the threshold value processing, and the like, are carried out on each of the R, G, and B color image signals. However, the image processing method and the image processing apparatus in accordance with the present invention are also applicable when an image signal representing a gray level image is processed.

In the third embodiment described above, as the first operation processing g carried out by the signal processing means 120, the weighting addition processing represented by Formula (1) is employed. However, the image processing method and the image processing apparatus in accordance with the present invention are not limited to the use of the operation processing represented by Formula (1), and one of various other appropriate operation processings may be employed.

For example, in a fifth embodiment of the image processing apparatus in accordance with the present invention, the operation processing represented by Formula (2) shown below may be employed.

$$fout=\{|f1-fin|(f1-fin)+|f2-fin|(f2-fin)\}/\{|f1-fin|+|f2-fin|\}+fin \quad (2)$$

wherein fin represents the original image signal, fout represents the processed image signal, f1 represents the graininess suppression processing image signal, and f2 represents the sharpness enhancement processing image signal.

Specifically, with the operation processing represented by Formula (2), the value, which is obtained from the weighting addition of the difference |R1−Rin| between the graininess suppression processing image signal R1 and the original image signal Rin and the difference |R2−Rin| between the sharpness enhancement processing image signal R2 and the original image signal Rin through weighting with the respective differences |R1−Rin|, |R2−Rin|, is taken as the value of the processed image signal Rout. Therefore, with respect to the image signal component representing a picture element corresponding to the flat image density area, at which graininess is more perceptible than sharpness is, the rate of contribution of the graininess suppression processing becomes high. Also, with respect to the image signal component representing a picture element corresponding to the image edge area, at which sharpness is more perceptible than graininess is, the rate of contribution of sharpness enhancement processing becomes high. Accordingly, graininess can be suppressed such that the image edge area may not become dull.

In the fifth embodiment, wherein the operation processing represented by Formula (2) is employed, there should preferably be employed a combination of the graininess suppression processing, which utilizes the morphology operation, and the sharpness enhancement processing operation (disclosed in U.S. Pat. No. 5,739,922, wherein the enhancement and suppression processing is carried out such that the high frequency components of the image may be enhanced and the middle frequency components of the image may be suppressed, and wherein the high frequency components and the middle frequency components, which have been obtained from the enhancement and suppression processing, and the low frequency components are combined with one another.

Experiments were carried out with respect to the coefficient (corresponding to the coefficients α1, α2, and α3) defining the threshold value T by taking a catch lights area in a pupil pattern of a human body image, which was photographed with film described in each of (1) and (2) below, as an example.

(1) An image was photographed with color film "G ACE800" (supplied by Fuji Photo Film Co., Ltd.) in a −2 under mode. With respect to a G signal Gin having 256 gradation levels (8 bits), which was acquired from the image, the threshold value T to be compared with |G1−Gin| was set to be 13. In such cases, the catch lights area could be prevented from being subjected to graininess suppression by mistake, and graininess suppression and sharpness enhancement on the image could simultaneously be achieved efficiently. At this time, the percentage of the threshold value T (=13) with respect to the number of gradation levels (=256) of the G signal was approximately 5%.

(2) An image was photographed with color film "G ACE400" (supplied by Fuji Photo Film Co., Ltd.) in a normal mode. With respect to a G signal Gin having 256 gradation levels (8 bits), which was acquired from the image, the threshold value T to be compared with |G1−Gin| was set to be 26. In such cases, the catch lights area could be prevented from being subjected to graininess suppression by mistake, and graininess suppression and sharpness enhancement on the image could simultaneously be achieved efficiently. At this time, the percentage of the threshold value T (=26) with respect to the number of gradation levels (=256) of the G signal was approximately 10%.

In the experiments described above, only the center picture element in the catch lights area was processed as the catch lights area. In the actual image, it is necessary that, besides the center of the pixel in the catch lights area, pixels adjacent to the center of the pixel in the catch lights area are also processed as the catch lights area, when necessary. Therefore, the threshold value was set at various different values in accordance with the results of the experiments described above, and an optimum threshold value was thereby found. Also, the coefficient value α appropriate for the number of gradation levels was set at a value falling within the range of 0.01 (1%) to 0.20 (20%), and more preferably at a value falling within the range of 0.02 (2%) to 0.10 (10%).

Figure 10:
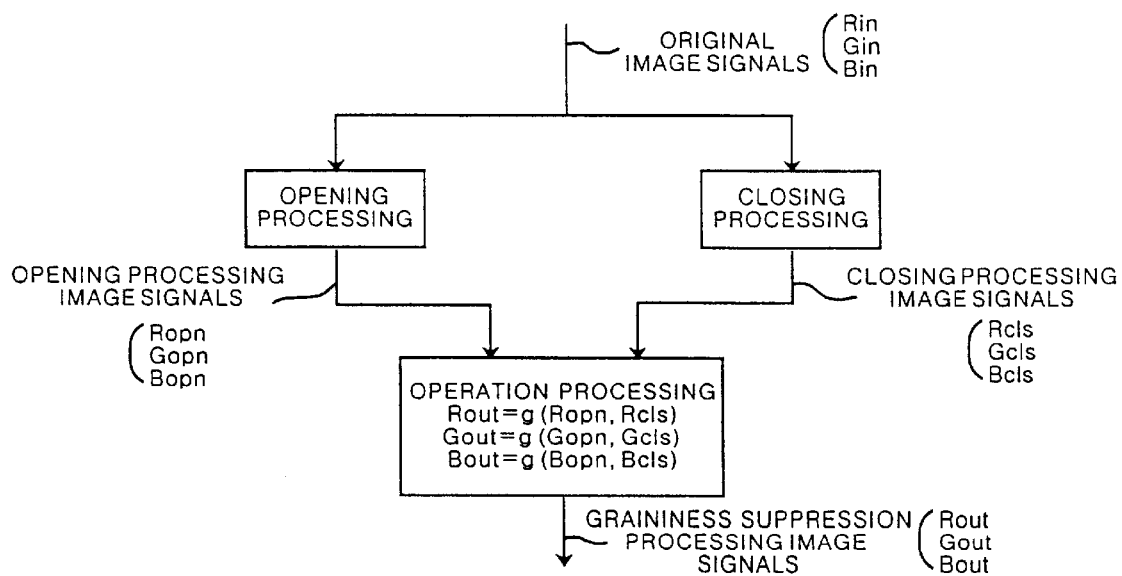
FIG. 10 is a flow chart showing how processing is carried out in a sixth embodiment of the image processing method in accordance with the present invention.
Figure 11:
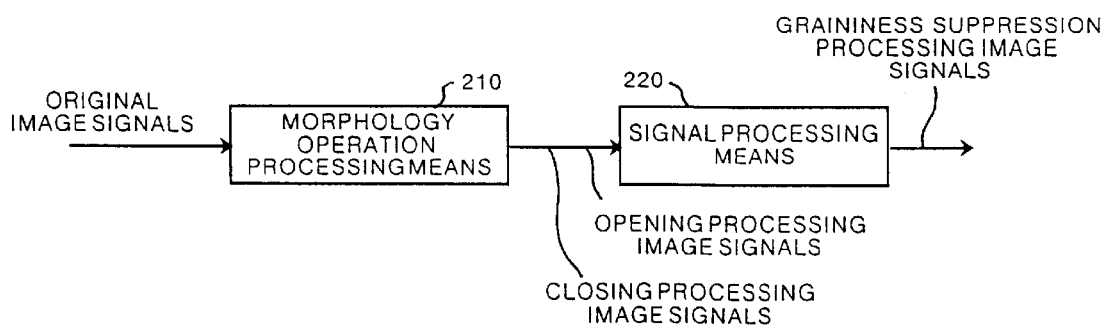
FIG. 11 is a block diagram showing an image processing apparatus for carrying out the sixth embodiment of FIG. 10.
Figures 13A, 13B, 13C, 13D:
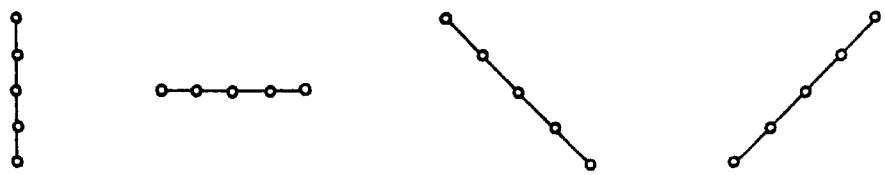
FIGS. 13A, 13B, 13C, and 13D are explanatory views showing rectilinear structure elements, which constitute a multi-structure element.

FIG. 10 is a flow chart showing how processing is carried out in a sixth embodiment of the image processing method in accordance with the present invention. FIG. 11 is a block diagram showing an image processing apparatus for carrying out the sixth embodiment of FIG. 10.

With reference to FIGS. 10 and 11, the image processing apparatus comprises a morphology operation processing means 210 for receiving RGB image signals Rin, Gin, and Bin, which represent a color image and have been acquired from photographing with a digital still camera or have been photoelectrically detected from a color photograph print or color film, and carrying out opening processing and closing processing in accordance with a morphology operation on each of the RGB image signals Rin, Gin, and Bin. Opening processing image signals Ropn, Gopn, and Bopn are obtained from the opening processing carried out by the morphology operation processing means 210. Also, closing processing image signals Rcls, Gcls, and Bcls are obtained from the closing processing carried out by the morphology operation processing means 210. The image processing apparatus also comprises a signal processing means 220 for carrying out processing for obtaining processed image signals (in this case, graininess suppression processing image signals) Rout, Gout, and Bout in accordance with the opening processing image signals Ropn, Gopn, and Bopn and the closing processing image signals Rcls, Gcls, and Bcls. The processed image signal Rout is obtained with operation processing g(Ropn, Rcls) carried out on image signal components of the opening processing image signal Ropn and the closing processing image signal Rcls, which image signal components represent corresponding pixels in two images represented by the opening processing image signal Ropn and the closing processing image signal Rcls. The processed image signal Gout is obtained with operation processing g(Gopn, Gcls) carried out on image signal components of the opening processing image signal Gopn and the closing processing image signal Gcls, which image signal components represent corresponding pixels in two images represented by the opening processing image signal Gopn and the closing processing image signal Gcls. Also, the processed image signal Bout is obtained with operation processing g(Bopn, Bcls) carried out on image signal components of the opening processing image signal Bopn and the closing processing image signal Bcls, which image signal components represent corresponding pixels in two images represented by the opening processing image signal Bopn and the closing processing image signal Bcls.

By way of example, as each operation processing g carried out by the signal processing means 220, the operation processing represented by Formula (3) shown below may be employed.

$$fout = \begin{cases} fopn & (\text{if } fcls = fin) \\ fcls & (\text{if } fopn = fin) \\ w1 \cdot fopn + w2 \cdot fcls & (\text{else}) \end{cases} \quad (3)$$

wherein w1 and w2 represent weight factors, w1+w2=1 (0<w1<1, 0<w2<1), fin represents the original image signal, fout represents the processed image signal (in this case, the graininess suppression processing image signal), fopn represents the opening processing image signal, and fcls represents the closing processing image signal.

The symbol "f" in Formula (3) is an ordinary representation of the signal value. In cases where the color image signals are to be processed in this embodiment, the symbol "f" serving as the ordinary representation is replaced by each of R, G, and B representing the color image signals.

Specifically, with the operation processing defined with Formula (3), as for a picture element, at which the value of the closing processing image signal Rcls is equal to the value of the original image signal Rin, the value of the opening processing image signal Ropn is taken as the value of the processed image signal Rout. As for a picture element, at which the value of the opening processing image signal Ropn is equal to the value of the original image signal Rin, the value of the closing processing image signal Rcls is taken as the value of the processed image signal Rout. As for a picture element, at which the value of the opening processing image signal Ropn and the value of the closing processing image signal Rcls are not equal to the value of the original image signal Rin, the addition processing through the weighting with the weight factors w1 and w2 is carried out on the opening processing image signal Ropn and the closing processing image signal Rcls. With respect to each of the other G and B image signals, the operation processing is carried out in the same manner.

In this embodiment, the weight factors w1 and w2 are set to be 0.5.

As a structure element (i.e., a mask) utilized for each of the opening processing and the closing processing carried out by the morphology operation processing means 210, a multi-structure element, which is constituted of four rectilinear structure elements shown in FIGS. 13A, 13B, 13C, and 13D, may be employed. (The multi-structure element has a mask size of 5 pixels×5 pixels. Alternatively, a multi-structure element, which is constituted of curvilinear structure elements that will be described later, or a multi-structure element, which is constituted of a combination of rectilinear structure elements and curvilinear structure elements, may be employed.) In the opening processing utilizing the multi-structure element, opening processing steps, each utilizing one of the structure elements constituting the multi-structure element, are carried out. Also, in the closing processing utilizing the multi-structure element, closing processing steps, each utilizing one of the structure elements constituting the multi-structure element, are carried out. In the cases of the opening processing, the maximum value of the values obtained from the opening processing steps is taken up. In the cases of the closing processing, the minimum value of the values obtained from the closing processing steps is taken up. The opening processing and the closing processing are useful when the signal values distributed in two-dimensional directions, as in the signal values representing an image, are to be processed. The mask size (i.e., the size of the structure element) may be altered in accordance with the size of the grainy area to be deleted. As for ordinary images, a multi-structure element having a size falling within the range of 3 pixels×3 pixels to 13 pixels×13 pixels should preferably be employed. A multi-structure element having a size falling within the range of 3 pixels×3 pixels to 7 pixels×7 pixels should more preferably be employed.

As an aid in facilitating the explanation, the processing will hereinbelow be described by taking a one-dimensional signal distribution, which corresponds to a cross-section of a two-dimensional image, as an example. Therefore, the processing with one of the structure elements constituting the multi-structure element will be described hereinbelow.

How the sixth embodiment of the image processing apparatus operates will be described hereinbelow by taking the R image signal Rin, which is one of the original image signals and has the distribution shown in FIG. 12A, as an example.

Firstly, each of the RGB image signals Rin, Gin, and Bin, which represent the color image, is fed from the digital still camera, or the like, into the morphology operation processing means 210. As described above, the image signal Rin has the distribution shown in FIG. 12A. Each of the other image signals Gin and Bin also has a predetermined distribution (not shown).

The original image signal Rin has an image density distribution with a comparatively large period, and noise (an area A in FIG. 12A) having frequency higher than the frequency of the image density distribution is superposed upon the image density distribution. FIG. 12B is an enlarged view showing high frequency noise (the area A) in the original image signal Rin shown in FIG. 12A.

The morphology operation processing means 210 carries out the opening processing and the closing processing in accordance with the morphology operation, in which the predetermined structure element is utilized, on each of the received original image signals Rin, Gin, and Bin and thereby calculates the opening processing image signals Ropn, Gopn, Bopn and the closing processing image signals Rcls, Gcls, Bcls. FIG. 12C is an enlarged view showing an area of the opening processing image signal Ropn obtained from the opening processing carried out on the original image signal Rin, which area corresponds to FIG. 12B (i.e., the area A in FIG. 12A). FIG. 12D is an enlarged view showing an area of the closing processing image signal Rcls obtained from the closing processing carried out on the original image signal Rin, which area corresponds to FIG. 12B (i.e., the area A in FIG. 12A).

As illustrated in FIG. 12C, in the opening processing image signal Ropn, convex image density change areas (positive noise) in the original image signal Rin (indicated by the broken lines in FIG. 12C) have been suppressed. Also, as illustrated in FIG. 12D, in the closing processing image signal Rcls, concave image density change areas (negative noise) in the original image signal Rin (indicated by the broken lines in FIG. 12D) have been suppressed.

In each of the other opening processing image signals Gopn and Bopn, as in the opening processing image signal Ropn, positive noise has been suppressed. In each of the other closing processing image signals Gcls and Bcls, as in the closing processing image signal Rcls, negative noise has been suppressed.

The opening processing image signals Ropn, Gopn, Bopn and the closing processing image signals Rcls, Gcls, Bcls, which have been calculated by the morphology operation processing means 210, are fed into the signal processing means 220.

The signal processing means 220 carries out the operation processing in accordance with Formula (3) shown above and on the received opening processing image signal and the received closing processing image signal, which correspond to each of the R, G, and B colors. The operation processing is carried out on the image signal components of the opening processing image signal and the closing processing image signal corresponding to each color, which image signal components represent corresponding pixels in the two images represented by the opening processing image signal and the closing processing image signal. In this manner, the processed image signal is calculated with respect to each color.

FIG. 12E shows the distribution of the processed image signal Rout, which is obtained by carrying out the operation processing in accordance with Formula (3) and on the opening processing image signal Ropn, which is shown in FIG. 12C, and the closing processing image signal Rcls, which is shown in FIG. 12D.

As illustrated in FIG. 12E, in the processed image signal Rout, both of positive noise and negative noise in the original image signal Rin (indicated by the broken lines in FIG. 12E) have been suppressed accurately. In this embodiment, the values of the weight factors w1 and w2 are set to be 0.5. However, the values of the weight factors w1 and w2 are not limited to 0.5, and may be set at various different values falling within an appropriate range.

As in the processed image signal Rout, each of the other processed image signals Gout and Bout can be obtained such that both of positive noise and negative noise may be suppressed accurately.

As described above, with the sixth embodiment of the image processing apparatus, each of the opening processing and the closing processing in accordance with the morphology operation is carried out on the given original image signal. The opening processing image signal, in which the positive noise has been suppressed, is obtained from the opening processing. Also, the closing processing image signal, in which the negative noise has been suppressed, is obtained from the closing processing. The operation processing is then carried out on the image signal components of the two image signals having been obtained from the opening processing and the closing processing, which image signal components represent corresponding pixels in the two images represented by the two image signals, and the processed image signal (in this case, the graininess suppression processing image signal) is thereby obtained. Therefore, positive noise and negative noise contained in the original image can be suppressed accurately.

In the sixth embodiment described above, as each operation processing g carried out by the signal processing means 220, the operation processing represented by Formula (3) is employed. However, the image processing method and the image processing apparatus in accordance with the present invention are not limited to the use of the operation processing represented by Formula (3), and one of various other appropriate operation processings may be employed.

For example, in a seventh embodiment of the image processing apparatus in accordance with the present invention, the operation processing represented by Formula (4) shown below may be employed.

$$fout=\{|fopn-fin|(fopn-fin)+|fcls-fin|(fcls-fin)\}/\{|fopn-fin|+|fcls-fin|\}+fin \quad (4)$$

Specifically, with the operation processing defined with Formula (4), as for a picture element, at which the value of the opening processing image signal Ropn is equal to the value of the original image signal Rin, the value of the closing processing image signal Rcls is taken as the value of the processed image signal Rout. As for a picture element, at which the value of the closing processing image signal Rcls is equal to the value of the original image signal Rin, the value of the opening processing image signal Ropn is taken as the value of the processed image signal Rout. As for a picture element, at which the value of the opening processing image signal Ropn and the value of the closing processing image signal Rcls are not equal to the value of the original image signal Rin, the addition through weighting with the difference (|Ropn−Rin| or |Rcls−Rin|) between the opening processing image signal Ropn or the closing processing image signal Rcls, whichever has a larger difference with respect to the original image signal Rin, (i.e., Ropn or Rcls) and the original image signal Rin is carried out, and the value obtained from the weighting addition is taken as the value of the processed image signal (in this case, the graininess suppression processing image signal) Rout. As for each of the other G and B color image signals, processing is carried out in the same manner.

With the seventh embodiment, wherein the operation processing represented by Formula (4) is employed, as in the sixth embodiment, wherein the operation processing represented by Formula (3) is employed, positive noise and negative noise can be suppressed accurately.

In the sixth embodiment, the R, G, and B image signals representing a color image are processed. However, the image processing method and the image processing apparatus in accordance with the present invention are not limited to the processing of the color image signals and are also applicable when various other signals, such as a luminance signal and color difference signals, are processed.

Figure 14:
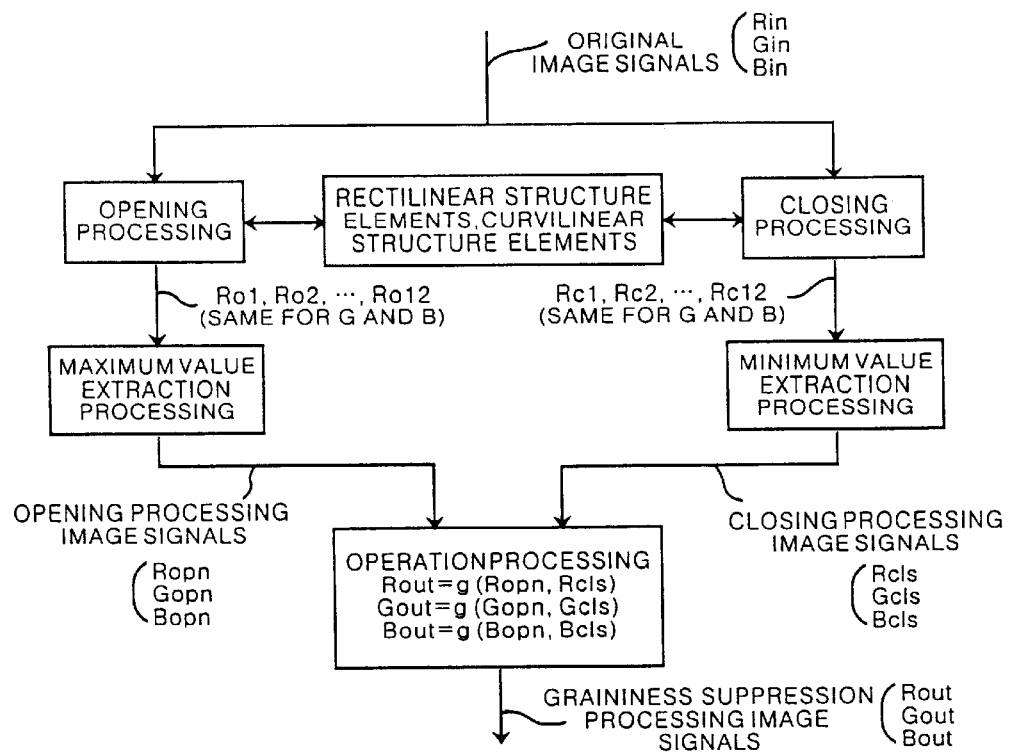
FIG. 14 is a flow chart showing how processing is carried out in an eighth embodiment of the image processing method in accordance with the present invention.
Figure 15:
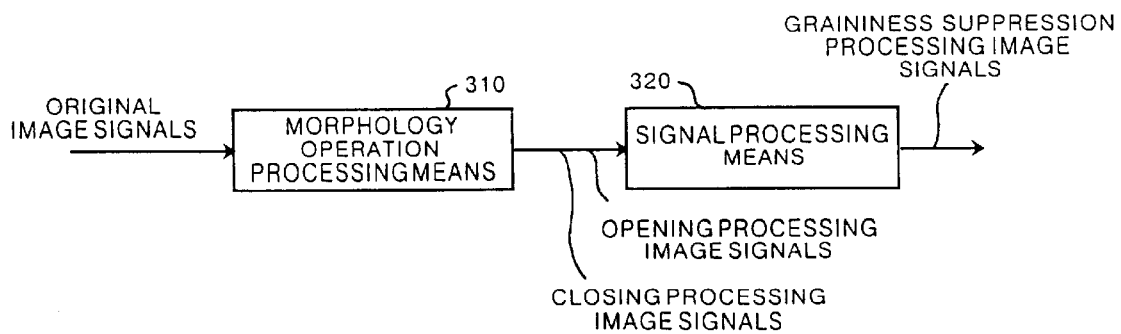
FIG. 15 is a block diagram showing an image processing apparatus for carrying out the eighth embodiment of FIG. 14, FIGS. 16A, 16B, 16C, and 16D are explanatory views showing rectilinear structure elements, which are utilized in opening processing and closing processing carried out by a morphology operation processing means 310 of the image processing apparatus shown in FIG. 15, FIGS. 16E through 16L are explanatory views showing curvilinear structure elements, which are utilized in the opening processing and the closing processing carried out by the morphology operation processing means 310 of the image processing apparatus shown in FIG. 15, and FIGS. 17A through 17H are explanatory views showing how a character pattern "A" and graininess are suppressed by rectilinear structure elements and a curvilinear structure element.

FIG. 14 is a flow chart showing how processing is carried out in an eighth embodiment of the image processing method in accordance with the present invention. FIG. 15 is a block diagram showing an image processing apparatus for carrying out the eighth embodiment of FIG. 14.

With reference to FIGS. 14 and 15, the image processing apparatus comprises a morphology operation processing means 310. The morphology operation processing means 310 receives RGB image signals Rin, Gin, and Bin, which represent a color image and have been acquired from photographing with a digital still camera or have been photoelectrically detected from a color photograph print or color film, and carries out the opening processing and the closing processing in accordance with the morphology operation on each of the RGB image signals Rin, Gin, and Bin. In the opening processing, opening processing steps, each utilizing one of rectilinear structure elements, which are shown in FIGS. 16A, 16B, 16C, and 16D, and curvilinear structure elements, which are shown in FIGS. 16E through 16L, are carried out. Also, in the closing processing, closing processing steps, each utilizing one of the structure elements shown in FIGS. 16A through 16L, are carried out. Signals Ro1, . . . , Ro12, Go1, . . . , Go12, Bo1, . . . , Bo12 are obtained from the opening processing steps. Also, signals Rc1, . . . , Rc12, Gc1, . . . , Gc12, Bc1, . . . , Bc12 are obtained from the opening processing steps. The maximum signal among the signals Ro1, . . . , Ro12, the maximum signal among the signals Go1, . . . , Go12, and the maximum signal among the signals Bo1, . . . , Bo12 are extracted, respectively, as opening processing image signals Ropn, Gopn, and Bopn. Also, the minimum signal among the signals Rc1, . . . , Rc12, the minimum signal among the signals Gc1, . . . , Gc12, and the minimum signal among the signals Bc1, . . . , Bc12 are extracted, respectively, as closing processing image signals Rcls, Gcls, and Bcls. The image processing apparatus also comprises a signal processing means 320 for carrying out processing for obtaining processed image signals (in this case, graininess suppression processing image signals) Rout, Gout, and Bout in accordance with the thus extracted opening processing image signals Ropn, Gopn, and Bopn and the thus extracted closing processing image signals Rcls, Gcls, and Bcls. The processed image signal Rout is obtained with operation processing g(Ropn, Rcls) carried out on image signal components of the opening processing image signal Ropn and the closing processing image signal Rcls, which image signal components represent corresponding pixels in two images represented by the opening processing image signal Ropn and the closing processing image signal Rcls. The processed image signal Gout is obtained with operation processing g(Gopn, Gcls) carried out on image signal components of the opening processing image signal Gopn and the closing processing image signal Gcls, which image signal components represent corresponding pixels in two images represented by the opening processing image signal Gopn and the closing processing image signal Gcls. Also, the processed image signal Bout is obtained with operation processing g(Bopn, Bcls) carried out on image signal components of the opening processing image signal Bopn and the closing processing image signal Bcls, which image signal components represent corresponding pixels in two images represented by the opening processing image signal Bopn and the closing processing image signal Bcls.

By way of example, as each operation processing g carried out by the signal processing means 320, the operation processing represented by Formula (11) shown below may be employed.

$$fout = w1 \cdot fopn + w2 \cdot fcls \quad (11)$$

wherein w1 and w2 represent weight factors, w1+w2=1 (0<w1<1, 0<w2<1), fout represents the processed image signal (in this case, the graininess suppression processing image signal), fopn represents the opening processing image signal, and fcls represents the closing processing image signal.

The symbol "f" in Formula (11) is an ordinary representation of the signal value. In cases where the color image signals are to be processed in this embodiment, the symbol "f" serving as the ordinary representation is replaced by each of R, G, and B representing the color image signals.

Specifically, with the operation processing defined with Formula (11), the addition processing through the weighting with the weight factors w1 and w2 is carried out on the opening processing image signal Ropn and the closing processing image signal Rcls. An addition processing image signal, which has thus been obtained, is taken as the processed image signal fout.

As for how to determine the weight factors w1 and w2, one of various techniques for determination may be employed. In this embodiment, the weight factors w1 and w2 are set at the most preferable values, i.e. w1=w2=0.5. With respect to each of the other G and B image signals, the weight factors w1 and w2 are set in the same manner. the operation processing is carried out in the same manner.

As the structure elements (i.e., the masks) utilized for each of the opening processing and the closing processing carried out by the morphology operation processing means 310, the four rectilinear structure elements, which are shown in FIGS. 16A, 16B, 16C, and 16D, and the eight curvilinear structure elements, which are shown in FIGS. 16E through 16L, are employed. Each of these structure elements is set to have a size falling within the range of 5 pixels (along the column in the array of the pixels)×5 pixels (along the row in the array of the pixels). The size of the structure element may be altered in accordance with the size of the grainy area to be deleted. As for ordinary images, a structure element having a size falling within the range of 3 pixels×3 pixels to 13 pixels×13 pixels should preferably be employed.

As an aid in facilitating the explanation, the processing will hereinbelow be described by taking a one-dimensional signal distribution, which corresponds to a cross-section of a two-dimensional image, as an example, except for a certain part.

How the eighth embodiment of the image processing apparatus operates will be described hereinbelow by taking the R image signal Rin, which is one of the original image signals and has the distribution shown in FIG. 12A, as an example.

Firstly, each of the RGB image signals Rin, Gin, and Bin, which represent the color image, is fed from the digital still camera, or the like, into the morphology operation processing means 310. As described above, the image signal Rin has the distribution shown in FIG. 12A. Each of the other image signals Gin and Bin also has a predetermined distribution (not shown).

The original image signal Rin has an image density distribution with the comparatively large period, and noise (the area A in FIG. 12A) having frequency higher than the frequency of the image density distribution is superposed upon the image density distribution. FIG. 12B is an enlarged view showing high frequency noise (the area A) in the original image signal Rin shown in FIG. 12A.

The morphology operation processing means 310 carries out the opening processing and the closing processing in accordance with the morphology operation, in which each of the structure elements shown in FIGS. 16A through 16L are utilized, on each of the received original image signals Rin, Gin, and Bin.

Figure 16A:
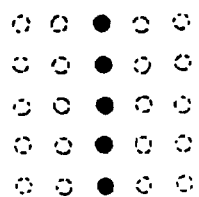
Figure 16B:
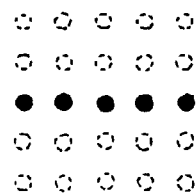
Figure 16C:
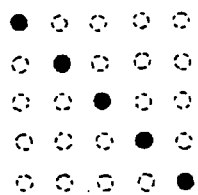
Figure 16D:
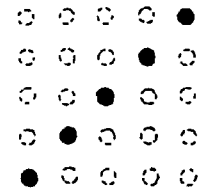
Figure 16E:
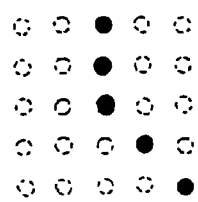
Figure 16F:
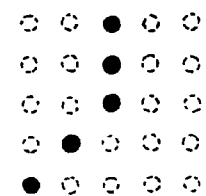
Figure 16G:
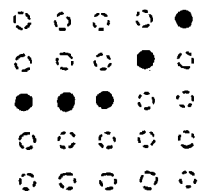
Figure 16H:
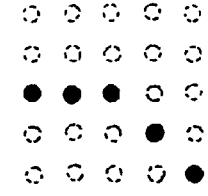
Figure 16I:
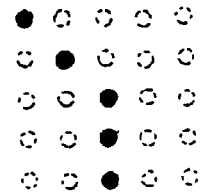
Figure 16J:
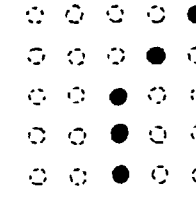
Figure 16K:
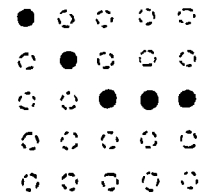
Figure 16L:
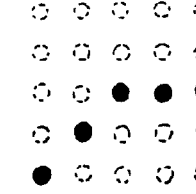

By way of example, the opening processing image signals, which have been obtained by carrying out the opening processing on the original image signals Rin, Gin, and Bin by using the rectilinear structure element shown in FIG. 16A, are represented by Ro1, Go1, and Bo1. The opening processing image signals, which have been obtained by carrying out the opening processing on the original image signals Rin, Gin, and Bin by using the rectilinear structure element shown in FIG. 16B, are represented by Ro2, Go2, and Bo2. The opening processing image signals, which have been obtained by carrying out the opening processing on the original image signals Rin, Gin, and Bin by using the structure elements shown in FIGS. 16C through 16L, are represented by Ro3~Ro12, Go3~Go12, and Bo3~Bo12. Also, the closing processing image signals, which have been obtained by carrying out the closing processing on the original image signals Rin, Gin, and Bin by using the rectilinear structure element shown in FIG. 16A, are represented by Rc1, Gc1, and Bc1. The closing processing image signals, which have been obtained by carrying out the closing processing on the original image signals Rin, Gin, and Bin by using the rectilinear structure element shown in FIG. 16B, are represented by Rc2, Gc2, and Bc2. The closing processing image signals, which have been obtained by carrying out the closing processing on the original image signals Rin, Gin, and Bin by using the structure elements shown in FIGS. 16C through 16L, are represented by Rc3~Rc12, Gc3~Gc12, and Bc3~Bc12.

Thereafter, with respect to each of the R, G, and B colors, the morphology operation processing means 310 extracts the maximum signal among the signals Ro1~Ro12, the maximum signal among the signals Go1~Go12, and the maximum signal among the signals Bo1~Bo12, respectively, as the opening processing image signals Ropn, Gopn, and Bopn. Also, the morphology operation processing means 310 extracts the minimum signal among the signals Rc1~Rc12, the minimum signal among the signals Gc1~Gc12, and the minimum signal among the signals Bc1~Bc12, respectively, as the closing processing image signals Rcls, Gcls, and Bcls.

FIG. 12C shows the area of the opening processing image signal Ropn, which area corresponds to FIG. 12B (i.e., the area A in FIG. 12A). FIG. 12D shows the area of the closing processing image signal Rcls, which area corresponds to FIG. 12B (i.e., the area A in FIG. 12A).

As illustrated in FIG. 12C, in the opening processing image signal Ropn, convex image density change areas (positive noise) in the original image signal Rin (indicated by the broken lines in FIG. 12C) have been suppressed. Also, as illustrated in FIG. 12D, in the closing processing image signal Rcls, concave image density change areas (negative noise) in the original image signal Rin (indicated by the broken lines in FIG. 12D) have been suppressed.

In each of the other opening processing image signals Gopn and Bopn, as in the opening processing image signal Ropn, positive noise has been suppressed. In each of the other closing processing image signals Gcls and Bcls, as in the closing processing image signal Rcls, negative noise has been suppressed.

The opening processing image signals Ropn, Gopn, Bopn and the closing processing image signals Rcls, Gcls, Bcls, which have been calculated by the morphology operation processing means 310, are fed into the signal processing means 320.

The signal processing means 320 carries out the weighting addition processing in accordance with Formula (11) shown above and on the received opening processing image signal and the received closing processing image signal, which correspond to each of the R, G, and B colors. The operation processing is carried out on the image signal components of the opening processing image signal and the closing processing image signal corresponding to each color, which image signal components represent corresponding pixels in the two images represented by the opening processing image signal and the closing processing image signal. In this manner, the processed image signal is calculated with respect to each color.

FIG. 12E shows the distribution of the processed image signal Rout, which is obtained by carrying out the operation processing in accordance with Formula (11) and on the opening processing image signal Ropn, which is shown in FIG. 12C, and the closing processing image signal Rcls, which is shown in FIG. 12D.

As illustrated in FIG. 12E, in the processed image signal Rout, both of positive noise and negative noise in the original image signal Rin (indicated by the broken lines in FIG. 12E) have been suppressed accurately. In this embodiment, the values of the weight factors w1 and w2 are set to be 0.5. However, the values of the weight factors w1 and w2 are not limited to 0.5, and may be set at various different values falling within an appropriate range.

As in the processed image signal Rout, each of the other processed image signals Gout and Bout can be obtained such that both of positive noise and negative noise may be suppressed accurately.

Also, with the eighth embodiment of the image processing apparatus, in each of the opening processing and the closing processing carried out by the morphology operation processing means 310, besides the processing steps with the rectilinear structure elements shown in FIGS. 16A, 16B, 16C, and 16D, the processing steps with a plurality of the curvilinear structure elements shown in FIGS. 16E through 16L are also carried out. Therefore, an image area having a large curvature, such as a character pattern, which will be suppressed as graininess by mistake with the processing using only the rectilinear structure elements, can be prevented from being suppressed. Accordingly, the graininess suppression processing can be carried out more accurately.

Figure 17A:
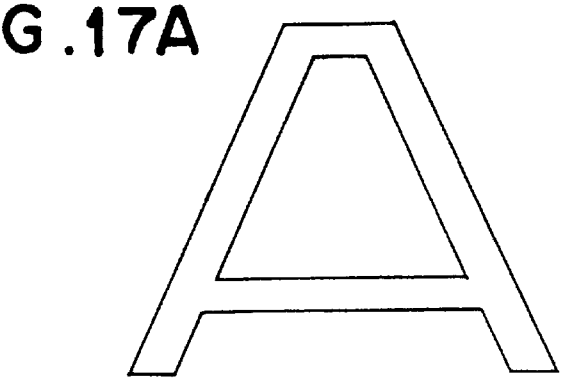
Figure 17B:
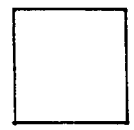
Figure 17C:
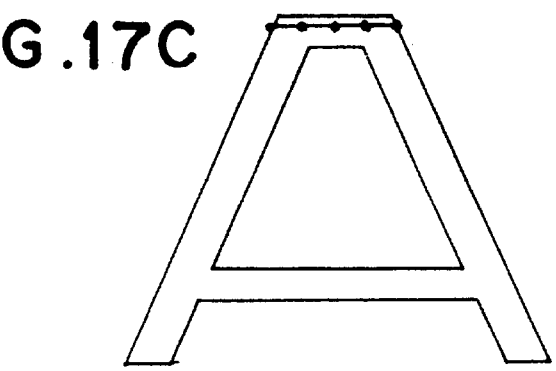
Figure 17D:
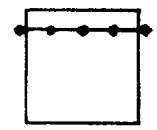
Figure 17E:
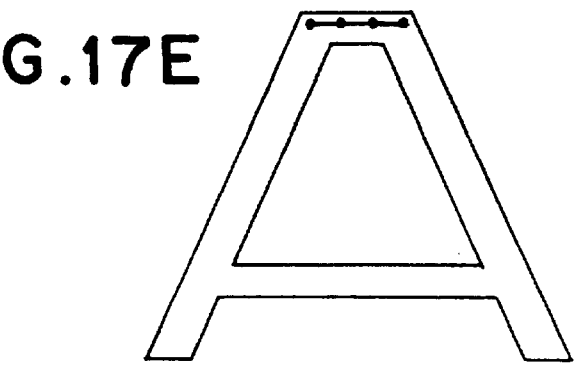
Figure 17F:
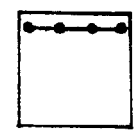

Specifically, a character pattern "A" shown in FIG. 17A and a grainy area shown in FIG. 17B may be embedded in an original image to be processed with this embodiment of the image processing apparatus. (In FIG. 17B, the grainy area is indicated by the rectangular contour.) In cases where the grainy area is to be suppressed and the character pattern "A" is to be retained, as illustrated in FIG. 17D, with the processing using only the rectilinear structure elements shown in FIGS. 16A, 16B, 16C, and 16D (5 pixels×5 pixels), the grainy area smaller than the structure element can be suppressed. However, in such cases, as illustrated in FIG. 17C, the end area having a large curvature in the character pattern is also suppressed. As illustrated in FIG. 17E, such that the end area of the character patter may be prevented from being suppressed, a smaller rectilinear structure element (which is set in the range of, for example, 4 pixels×4 pixels) may be employed. In such cases, suppression of the end area of the character pattern can be prevented. However, in such cases, as illustrated in FIG. 17F, graininess suppression cannot be effected.

Figure 17G:
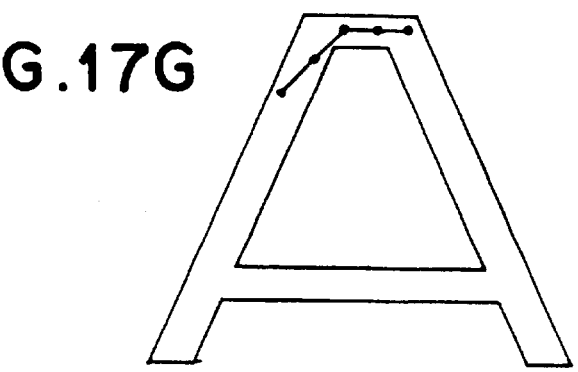
Figure 17H:

With this embodiment of the image processing apparatus, besides the processing with the rectilinear structure elements, the processing with the curvilinear structure elements is also carried out. Therefore, for example, as illustrated in FIG. 17G, with the processing using the curvilinear structure element shown in FIG. 16L, the end area of the character pattern can be prevented from being suppressed. Further, as illustrated in FIG. 17H, graininess can be suppressed.

As described above, with the eighth embodiment of the image processing apparatus, each of the opening processing and the closing processing in accordance with the morphology operation, in which the rectilinear structure elements and the curvilinear structure elements are utilized, is carried out on the given original image signal. The opening processing image signal, in which the positive noise has been suppressed, is obtained from the opening processing. Also, the closing processing image signal, in which the negative noise has been suppressed, is obtained from the closing processing. The operation processing is then carried out on the image signal components of the two image signals having been obtained from the opening processing and the closing processing, which image signal components represent corresponding pixels in the two images represented by the two image signals, and the processed image signal (in this case, the graininess suppression processing image signal) is thereby obtained. Therefore, positive noise and negative noise contained in the original image can be suppressed accurately. Further, an image area having a large curvature, such as a character pattern, which will be suppressed as graininess by mistake with the processing using only the rectilinear structure elements, can be prevented from being suppressed. Accordingly, the graininess suppression processing can be carried out more accurately.

In the eighth embodiment described above, as each operation processing g carried out by the signal processing means 320, the operation processing represented by Formula (11) is employed. However, the image processing method and the image processing apparatus in accordance with the present invention are not limited to the use of the operation processing represented by Formula (11), and one of various other appropriate operation processings may be employed.

For example, in a ninth embodiment of the image processing apparatus in accordance with the present invention, the operation processing represented by Formula (3) shown below may be employed.

$$fout = \begin{cases} fopn & (\text{if } fcls = fin) \\ fcls & (\text{if } fopn = fin) \\ w1 \cdot fopn + w2 \cdot fcls & (\text{else}) \end{cases} \quad (3)$$

wherein w1 and w2 represent weight factors, w1+w2=1 (0<w1<1, 0<w2<1), fin represents the original image signal, fout represents the processed image signal (in this case, the graininess suppression processing image signal), fopn represents the opening processing image signal, and fcls represents the closing processing image signal.

Specifically, with the operation processing defined with Formula (3), as for a picture element, at which the value of the closing processing image signal Rcls is equal to the value of the original image signal Rin, the value of the opening processing image signal Ropn is taken as the value of the processed image signal Rout. As for a picture element, at which the value of the opening processing image signal Ropn is equal to the value of the original image signal Rin, the value of the closing processing image signal Rcls is taken as the value of the processed image signal Rout. As for a picture element, at which the value of the opening processing image signal Ropn and the value of the closing processing image signal Rcls are not equal to the value of the original image signal Rin, the addition processing through the weighting with the weight factors w1 and w2 is carried out on the opening processing image signal Ropn and the closing processing image signal Rcls. With respect to each of the other G and B image signals, the operation processing is carried out in the same manner.

With the ninth embodiment, wherein the operation processing represented by Formula (3) is employed, as in the eighth embodiment, wherein the operation processing represented by Formula (11) is employed, positive noise and negative noise can be suppressed accurately. Also, an image area having a large curvature, such as a character pattern, can be prevented from being suppressed. Accordingly, the graininess suppression processing can be carried out more accurately.

Further, as each operation processing g carried out by the signal processing means 320, the operation processing represented by Formula (4) shown below may be employed.

$$fout = \{|fopn - fin|(fopn - fin) + |fcls - fin|(fcls - fin)\} / \{|fopn - fin| + |fcls - fin|\} + fin \quad (4)$$

Specifically, with the operation processing defined with Formula (4), as for a picture element, at which the value of the opening processing image signal Ropn is equal to the value of the original image signal Rin, the value of the closing processing image signal Rcls is taken as the value of the processed image signal Rout. As for a picture element, at which the value of the closing processing image signal Rcls is equal to the value of the original image signal Rin, the value of the opening processing image signal Ropn is taken as the value of the processed image signal Rout. As for a picture element, at which the value of the opening processing image signal Ropn and the value of the closing processing image signal Rcls are not equal to the value of the original image signal Rin, the addition through weighting with the difference (|Ropn−Rin| or |Rcls−Rin|) between the opening processing image signal Ropn or the closing processing image signal Rcls, whichever has a larger difference with respect to the original image signal Rin, (i.e., Ropn or Rcls) and the original image signal Rin is carried out, and the value obtained from the weighting addition is taken as the value of the processed image signal (in this case, the graininess suppression processing image signal) Rout. As for each of the other G and B color image signals, processing is carried out in the same manner.

In cases where the operation processing represented by Formula (4) is employed, as in the eighth embodiment, wherein the operation processing represented by Formula (11) is employed, positive noise and negative noise can be suppressed accurately. Also, an image area having a large curvature, such as a character pattern, can be prevented from being suppressed. Accordingly, the graininess suppression processing can be carried out more accurately.

In the eighth embodiment, the R, G, and B image signals representing a color image are processed. However, the image processing method and the image processing apparatus in accordance with the present invention are not limited to the processing of the color image signals and are also applicable when various other signals, such as a luminance signal and color difference signals, are processed.

Also, in the eighth embodiment, the steps using the rectilinear structure elements and the curvilinear structure elements are carried out in both of the opening processing and the closing processing. However, the image processing method and the image processing apparatus in accordance with the present invention are not limited to such an embodiment, and the rectilinear structure elements and the curvilinear structure elements may be utilized in at least either one of the opening processing and the closing processing.

The image processing method and the image processing apparatus in accordance with the present invention are applicable to the processing of an image signal, which has been obtained by photoelectrically reading out an image recorded on photographic film, a print, or the like, and an image signal, which has been acquired from photographing with a digital still camera.

The image processing method and the image processing apparatus in accordance with the present invention are also applicable to the processing of an image signal having been obtained from an image, which has been formed with an image forming method utilizing a predetermined photosensitive material, which is proposed in Japanese Patent Application No. 9(1997)-56551 (or European Patent Publication No. 800.114A). It has been found that the image processing method and the image processing apparatus in accordance with the present invention are particularly efficient for suppressing graininess due to grainy constituents remaining in a silver image, which graininess is inherent to such an image signal.

In the image forming method proposed in Japanese Patent Application No. 9(1997)-56551, a photosensitive material is utilized, which contains photosensitive silver halide grains and forms an image corresponding to a latent image having been recorded through exposure when it is overlaid upon a predetermined processing material and heated. A latent image is recorded through exposure on the photosensitive material. The photosensitive material and the processing material are then overlaid one upon the other and heated. In this manner, the image, which corresponds to the latent image having been recorded on the photosensitive material, is formed on the photosensitive material. The photosensitive material, on which the image has thus been formed, is separated from the processing material. The image having been formed on the photosensitive material is read out by a scanner, and an image signal representing the image is thereby obtained. Predetermined image processing is then carried out on the image signal, and a digital image signal capable of reproducing an image is thereby formed. The photosensitive material is the one capable of developing the recorded latent image with the so-called non-wet type of processing step (a small amount of water may be used). By way of example, the photosensitive material may be a coloring agent-containing heat developable photosensitive material comprising a substrate and at least three kinds of photosensitive layers overlaid on the substrate. The photosensitive layers contain at least photosensitive silver halide particles, a binder, and a coloring agent having functions for releasing or diffusing a diffusing dye image-wise. The photosensitive layers have different wavelength regions to which they are sensitive, and exhibit different hues after development processing of the coloring agent. The processing material may have the characteristics such that, when it is overlaid upon the coloring agent-containing heat developable photosensitive material and heated, it may form the image on the coloring agent-containing heat developable photosensitive material. The processing material may be a mordant-containing processing material, which comprises a substrate and a layer containing at least a mordant and being overlaid upon the substrate. The processing material should preferably be the material capable of removing at least part of the diffusing dye, which is released from the coloring agent-containing heat developable photosensitive material due to heating, from the photosensitive material and thereby forming an image of at least three colors on the photosensitive material.

Alternatively, the photosensitive material may be a heat developable photosensitive material comprising a substrate and at least three kinds of photosensitive layers overlaid on the substrate. The photosensitive layers contain at least photosensitive silver halide grains, a binder, a color developing agent, and a dye-donating coupler. The photosensitive layers have different wavelength regions to which they are sensitive, and exhibit different hues of dyes, which are formed from an oxidant of the color developing agent and the dye-donating coupler. The processing material may have the characteristics such that, when it is overlaid upon the heat development photosensitive material and heated, it may form the image on the heat developable photosensitive material. With heating, an image of at least three colors may be formed on the heat developable photosensitive material.

As another alternative, the photosensitive material may be a photosensitive material comprising a transparent substrate and at least three kinds of photosensitive layers overlaid on the substrate. The photosensitive layers contain at least photosensitive silver halide grains, a color developing agent, a coupler, and a binder. The photosensitive layers have different wave length regions to which they are sensitive, and exhibit different absorption wavelength regions of dyes, which are formed from an oxidant of the color developing agent and the coupler. The processing material may comprise a substrate and a processing layer containing at least a base and/or a base precursor and being overlaid upon the substrate. The photosensitive member and the processing member are overlaid one upon the other such that the photosensitive layers of the photosensitive material and the processing layer of the processing material may stand facing each other. In this state, the photosensitive material and the processing material are heated in the presence of water in an amount corresponding to a ratio between 0.1 and 1 with respect to the amount, which is required to effect the maximum swelling of all coating layers, except for backing layers of the photosensitive material and the processing material. In this manner, an image of at least three colors based upon non-diffusing dyes may be formed on the photosensitive material.

What is claimed is:

1. An image processing method, wherein predetermined processing is carried out on an original image signal, which is made up of a series of image signal components defining values of pixels constituting an original image, and a processed image signal is thereby obtained, the method comprising the steps of:

i) carrying out graininess suppression image processing on the original image signal, a graininess suppression processing image signal being obtained from said graininess suppression image processing, ii) carrying out sharpness enhancement image processing on the original image signal, a sharpness enhancement processing image signal, a sharpness enhancement processing image signal being obtained from said sharpness enhancement image processing, and iii) carrying out processing for obtaining the processed image signal in accordance with said graininess suppression processing image signal and said sharpness enhancement processing image signal, the processed image signal being obtained with operation processing carried out on image signal components of said graininess suppression processing image signal and said sharpness enhancement processing image signal, which image signal components represent corresponding pixels in two images represented by said graininess suppression processing image signal and said sharpness enhancement processing image signal, wherein a calculation is made to find a difference between image signal components of said graininess suppression processing image signal and the original image signal, which image signal components represent corresponding pixels in two images represented by said graininess suppression processing image signal and the original image signal, the calculated difference and a predetermined threshold value are compared with each other, with respect to pixels, which have been found, as a result of said comparison, to be associated with the difference smaller than said predetermined threshold value, the processed image signal is obtained with said operation processing, and with respect to pixels, which have been found, as a result of said comparison, to be associated with the difference larger than said predetermined threshold value, the original image signal, and enhancement processing signal, which is obtained by carrying out enhancement processing on the original image signal, or said sharpness enhancement processing image signal is taken as the processed image signal.

2. A method as defined in claim 1 wherein said predetermined threshold value takes a value falling within the range of 1% to 20% of the number of gradation levels of the original image signal.

3. A method as defined in claim 1 wherein said operation processing is operation processing defined with the formula:

$$f\text{out} = w1 \cdot f1 + w2 \cdot f2 \tag{1}$$

wherein w1 and w2 represent weight factors, w1+w2=1 (0<w1<1, 0<w2<1), fout represents the processed image signal, f1 represents the graininess suppression processing image signal, and f2 represents the sharpness enhancement processing image signal.

4. A method as defined in claim 1 wherein said operation processing is operation processing defined with the formula:

$$f\text{out} = \{|f1 - f\text{in}|(f1 - f\text{in}) + |f2 - f\text{in}|(f2 - f\text{in})\} / \{|f1 - f\text{in}| + |f2 - f\text{in}|\} + f\text{in} \tag{2}$$

wherein fin represents the original image signal, fout represents the processed image signal, f1 represents the graininess suppression processing image signal, and f2 represents the sharpness enhancement processing image signal.

5. A method as defined in claim 1 wherein said sharpness enhancement image processing is processing comprising the steps of:

a) separating the original image signal into low frequency components, middle frequency components, and high frequency components, b) carrying out enhancement and suppression processing such that said high frequency components may be enhanced and said middle frequency components may be suppressed, and c) combining said high frequency components and said middle frequency components, which have been obtained from said enhancement and suppression processing, and said low frequency components with one another, said sharpness enhancement processing image signal being thereby obtained, and said graininess suppression image processing is smoothing processing in accordance with a morphology operation.

6. A method as defined in claim 5 wherein said smoothing processing in accordance with said morphology operation is processing comprising the steps of:

a) carrying out opening processing in accordance with a morphology operation on the original image signal, an opening processing image signal being obtained from said opening processing, b) carrying out closing processing in accordance with the morphology operation on the original image signal, a closing processing image signal being obtained from said closing processing, and c) carrying out operation processing in accordance with said opening processing image signal and said closing processing image signal, said operation processing being carried out on image signal components of said opening processing image signal and said closing processing image signal, which image signal components represent corresponding pixels in two images represented by said opening processing image signal and said closing processing image signal, said operation processing being defined with the formula:

$$fout = \begin{cases} fopn & (\text{if } fcls = fin) \\ fcls & (\text{if } fopn = fin) \\ w1 \cdot fopn + w2 \cdot fcls & (\text{else}) \end{cases} \quad (3)$$

wherein w1 and w2 represent weight factors, w1+w2=1 (0<w1<1, 0<w2<1), fin represents the original image signal, fout represents the graininess suppression processing image signal, fopn represents the opening processing image signal, and fcls represents the closing processing image signal.

7. A method as defined in claim 6 wherein each of said weight factors w1 and w2 takes a value of 0.5.

8. A method as defined in claim 5 wherein said smoothing processing in accordance with said morphology operation is processing comprising the steps of:

a) carrying out opening processing in accordance with a morphology operation on the original image signal, an opening processing image signal being obtained from said opening processing, b) carrying out closing processing in accordance with the morphology operation on the original image signal, a closing processing image signal being obtained from said closing processing, and c) carrying out operation processing in accordance with said opening processing image signal and said closing processing image signal, said operation processing being carried out on image signal components of said opening processing image signal and said closing processing image signal, which image signal components represent corresponding pixels in two images represented by said opening processing image signal and said closing processing image signal, said operation processing being defined with the formula:

$$fout=\{|fopn-fin|(fopn-fin)+|fcls-fin|(fcls-fin)\}/\{|fopn-fin|+|fcls-fin|\}+fin \quad (4)$$

wherein fin represents the original image signal, fout represents the graininess suppression processing image signal, fopn represents the opening processing image signal, and fcls represents the closing processing image signal.

9. An image processing apparatus, wherein predetermined processing is carried out on an original image signal, which is made up of a series of image signal components defining values of pixels constituting an original image, and a processed image signal is thereby obtained, the apparatus comprising:

i) a graininess suppression processing means for carrying out graininess suppression image processing on the original image signal, a graininess suppression processing image signal being obtained from said graininess suppression image processing, ii) a sharpness enhancement processing means for carrying out sharpness enhancement image processing on the original image signal, a sharpness enhancement processing image signal being obtained from said sharpness enhancement image processing, and iii) a signal processing means for carrying out processing for obtaining the processed image signal in accordance with said graininess suppression processing image signal, which has been obtained from said graininess suppression processing means, and said sharpness enhancement processing image signal, which has been obtained from said sharpness enhancement processing means, the processed image signal being obtained with operation processing carried out on image signal components of said graininess suppression processing image signal and said sharpness enhancement processing image signal, which image signal components represent corresponding pixels in two images represented by said graininess suppression processing image signal and said sharpness enhancement processing image signal, wherein the apparatus further comprises a comparison means for calculating a difference between image signal components of said graininess suppression processing image signal, which has been obtained from said graininess suppression processing means, and the original image signal, which image signal components represent corresponding pixels in two images represented by said graininess suppression processing image signal and the original image fin, and comparing the calculated difference and a predetermined threshold value with each other, and said signal processing means carries out processing, which comprises the steps of:

a) with respect to pixels, which have been found, as a result of said comparison made by said comparison means, to be associated with the difference smaller than said predetermined threshold value, obtaining the processed image signal by carrying out said operation processing on the image signal components of said graininess suppression processing image signal and said sharpness enhancement processing image signal having been obtained from said sharpness enhancement processing means, which image signal components represent corresponding pixels in two images represented by said graininess suppression processing image signal and said sharpness enhancement processing image signal, and b) with respect to pixels, which have been found, as a result of said comparison, to be associated with the difference larger than said predetermined threshold value, taking the original image signal, an enhancement processing signal, which is obtained by carrying out enhancement processing on the original image signal, or said sharpness enhancement processing image signal as the processed image signal.

10. An apparatus as defined in claim 9 wherein said predetermined threshold value takes a value falling within the range of 1% to 20% of the number of gradation levels of the original image signal.

11. An apparatus as defined in claim 9 wherein said operation processing, which is carried out by said signal processing means, is operation processing defined with the formula:

$$fout=w1 \cdot f1+w2 \cdot f2 \quad (1)$$

wherein w1 and w2 represent weight factors, w1+w2=1 (0<w1<1, 0<w2<1), fout represents the processed image signal, f1 represents the graininess suppression processing image signal, and f2 represents the sharpness enhancement processing image signal.

12. An apparatus as defined in claim 9 wherein said operation processing, which is carried out by said signal processing means, is operation processing defined with the formula:

$$fout=\{|f1-fin|(f1-fin)+|f2-fin|(f2-fin)\}/\{|f1-fin|+|f2-fin|\}+fin \quad (2)$$

wherein fin represents the original image signal, fout represents the processed image signal, f1 represents the graininess suppression processing image signal, and f2 represents the sharpness enhancement processing image signal.

13. An apparatus as defined in claim 9 wherein said sharpness enhancement image processing, which is carried out by said sharpness enhancement processing means, is processing comprising the steps of:
   a) separating the original image signal into low frequency components, middle frequency components, and high frequency components,
   b) carrying out enhancement and suppression processing such that said high frequency components may be enhanced and said middle frequency components may be suppressed, and
   c) combining said high frequency components and said middle frequency components, which have been obtained from said enhancement and suppression processing, and said low frequency components with one another, said sharpness enhancement processing image signal being thereby obtained, and said graininess suppression image processing, which is carried out by said graininess suppression processing means, is smoothing processing in accordance with a morphology operation.

14. An image processing apparatus, wherein predetermined processing is carried out on an original image signal, which is made up of a series of image signal components defining values of pixels constituting an original image, and a processed image signal is thereby obtained, the apparatus comprising:
   i) a graininess suppression processing means for carrying out graininess suppression image processing on the original image signal, a graininess suppression processing image signal being obtained from said graininess suppression image processing,
   ii) a sharpness enhancement processing means for carrying out sharpness enhancement image processing on the original image signal, a sharpness enhancement processing image signal being obtained from said sharpness enhancement image processing, and
   iii) a signal processing means for carrying out processing for obtaining the processed image signal in accordance with said graininess suppression processing image signal, which has been obtained from said graininess suppression processing means, and said sharpness enhancement processing image signal, which has been obtained from said sharpness enhancement processing means, the processed image signal being obtained with operation processing carried out on image signal components of said graininess suppression processing image signal and said sharpness enhancement processing image signal, which image signal components represent corresponding pixels in two images represented by said graininess suppression processing image signal and said sharpness enhancement processing image signal,
   wherein said graininess suppression processing means comprises:
      a) a morphology operation processing means for carrying out opening processing and closing processing in accordance with a morphology operation, respectively, on the original image signal, an opening processing image signal being obtained from said opening processing, a closing processing image signal being obtained from said closing processing, and
      b) a signal processing means for carrying out processing for obtaining said graininess suppression processing image signal in accordance with said opening processing image signal and said closing processing image signal, which have been obtained from said morphology operation processing means, said graininess suppression processing image signal being obtained with operation processing carried out on image signal components of said opening processing image signal and said closing processing image signal, which image signal components represent corresponding pixels in two images represented by said opening processing image signal and said closing processing image signal, said operation processing being defined with the formula:

$$fout = \begin{cases} fopn & (\text{if } fcls = fin) \\ fcls & (\text{if } fopn = fin) \\ w1 \cdot fopn + w2 \cdot fcls & (\text{else}) \end{cases} \quad (3)$$

wherein w1 and w2 represent weight factors, w1+w2=1 (0<w1<1, 0<w2<1), fin represents the original image signal, fout represents the graininess suppression processing image signal, fopn represents the opening processing image signal, and fcls represents the closing processing image signal.

15. An apparatus as defined in claim 14 wherein each of said weight factors w1 and w2 takes a value of 0.5.

16. An image processing apparatus, wherein predetermined processing is carried out on an original image signal, which is made up of a series of image signal components defining values of pixels constituting an original image, and a processed image signal is thereby obtained, the apparatus comprising:
   i) a graininess suppression processing means for carrying out graininess suppression image processing on the original image signal, a graininess suppression processing image signal being obtained from said graininess suppression image processing,
   ii) a sharpness enhancement processing means for carrying out sharpness enhancement image processing on the original image signal, a sharpness enhancement processing image signal being obtained from said sharpness enhancement image processing, and
   iii) a signal processing means for carrying out processing for obtaining the processed image signal in accordance with said graininess suppression processing image signal, which has been obtained from said graininess suppression processing means, and said sharpness enhancement processing image signal, which has been obtained from said sharpness enhancement processing means, the processed image signal being obtained with operation processing carried out on image signal components of said graininess suppression processing image signal and said sharpness enhancement processing image signal, which image signal components represent corresponding pixels in two images represented by said graininess suppression processing image signal and said sharpness enhancement processing image signal,
   wherein said graininess suppression processing means comprises:
      a) a morphology operation processing means for carrying out opening processing and closing processing in accordance with a morphology operation, respectively, on the original image signal, an opening processing image signal being obtained from said opening processing, a closing processing image signal being obtained from said closing processing, and b) a signal processing means for carrying out processing for obtaining said graininess suppression processing image signal in accordance with said opening processing image signal and said closing processing image signal, which have been obtained from said morphology operation processing means, said graininess suppression processing image signal being obtained with operation processing carried out on image signal components of said opening processing image signal and said closing processing image signal, which image signal components represent corresponding pixels in two images represented by said opening processing image signal and said closing processing image signal, said operation processing being defined with the formula:

$$fout=\{|fopn-fin|(fopn-fin)+|fcls-fin|(fcls-fin)\}/\{|fopn-fin|+|fcls-fin|\}+fin \quad (4)$$

wherein fin represents the original image signal, fout represents the graininess suppression processing image signal, fopn represents the opening processing image signal, and fcls represents the closing processing image signal.

17. An image processing method, wherein predetermined processing is carried out on an original image signal, which is made up of a series of image signal components defining values of pixels constituting an original image, and a graininess suppression processing image signal is thereby obtained, the method comprising the steps of:

i) carrying out opening processing in accordance with a morphology operation on the original image signal, an opening processing image signal being obtained from said opening processing, ii) carrying out closing processing in accordance with the morphology operation on the original image signal, a closing processing image signal being obtained from said closing processing, and iii) carrying out processing for obtaining the graininess suppression processing image signal in accordance with said opening processing image signal and said closing processing image signal, the graininess suppression processing image signal being obtained with operation processing carried out on image signal components of said opening processing image signal and said closing processing image signal, which image signal components represent corresponding pixels in two images represented by said opening processing image signal and said closing processing image signal, said operation processing being defined with the formula:

$$fout = \begin{cases} fopn & (\text{if } fcls = fin) \\ fcls & (\text{if } fopn = fin) \\ w1 \cdot fopn + w2 \cdot fcls & (\text{else}) \end{cases} \quad (3)$$

wherein w1 and w2 represent weight factors, w1+w2=1 (0<w1<1, 0<w2<1), fin represents the original image signal, fout represents the graininess suppression processing image signal, fopn represents the opening processing image signal, and fcls represents the closing processing image signal.

18. A method as defined in claim 17 wherein each of said weight factors w1 and w2 takes a value of 0.5.

19. An image processing method, wherein predetermined processing is carried out on an original image signal, which is made up of a series of image signal components defining values of pixels constituting an original image, and a graininess suppression processing image signal is thereby obtained, the method comprising the steps of:

i) carrying out opening processing in accordance with a morphology operation on the original image signal, an opening processing image signal being obtained from said opening processing, ii) carrying out closing processing in accordance with the morphology operation on the original image signal, a closing processing image signal being obtained from said closing processing, and iii) carrying out processing for obtaining the graininess suppression processing image signal in accordance with said opening processing image signal and said closing processing image signal, the graininess suppression processing image signal being obtained with operation processing carried out on image signal components of said opening processing image signal and said closing processing image signal, which image signal components represent corresponding pixels in two images represented by said opening processing image signal and said closing processing image signal, said operation processing being defined with the formula:

$$fout=\{|fopn-fin|(fopn-fin)+|fcls-fin|(fcls-fin)\}/\{|fopn-fin|+|fcls-fin|\}+fin \quad (4)$$

wherein fin represents the original image signal, fout represents the graininess suppression processing image signal, fopn represents the opening processing image signal, and fcls represents the closing processing image signal.

20. An image processing apparatus, wherein predetermined processing is carried out on an original image signal, which is made up of a series of image signal components defining values of pixels constituting an original image, and a graininess suppression processing image signal is thereby obtained, the apparatus comprising:

i) a morphology operation processing means for carrying out opening processing and closing processing in accordance with a morphology operation, respectively, on the original image signal, an opening processing image signal being obtained from said opening processing, a closing processing image signal being obtained from said closing processing, and ii) a signal processing means for carrying out processing for obtaining the graininess suppression processing image signal in accordance with said opening processing image signal and said closing processing image signal, which have been obtained from said morphology operation processing means, the graininess suppression processing image signal being obtained with operation processing carried out on image signal components of said opening processing image signal and said closing processing image signal, which image signal components represent corresponding pixels in two images represented by said opening processing image signal and said closing processing image signal, said operation processing being defined with the formula:

$$fout = \begin{cases} fopn & (\text{if } fcls = fin) \\ fcls & (\text{if } fopn = fin) \\ w1 \cdot fopn + w2 \cdot fcls & (\text{else}) \end{cases} \quad (3)$$

wherein w1 and w2 represent weight factors, w1+w2=1 (0<w1<1, 0<w2<1), fin represents the original image signal, fout represents the graininess suppression processing image signal, fopn represents the opening processing image signal, and fcls represents the closing processing image signal.

21. An apparatus as defined in claim 20 wherein each of said weight factors w1 and w2 takes a value of 0.5.

22. An image processing apparatus, wherein predetermined processing is carried out on an original image signal, which is made up of a series of image signal components defining values of pixels constituting an original image, and a graininess suppression processing image signal is thereby obtained, the apparatus comprising:

i) a morphology operation processing means for carrying out opening processing and closing processing in accordance with a morphology operation, respectively, on the original image signal, an opening processing image signal being obtained from said opening processing, a closing processing image signal being obtained from said closing processing, and ii) a signal processing means for carrying out processing for obtaining the graininess suppression processing image signal in accordance with said opening processing image signal and said closing processing image signal, which have been obtained from said morphology operation processing means, the graininess suppression processing image signal being obtained with operation processing carried out on image signal components of said opening processing image signal and said closing processing image signal, which image signal components represent corresponding pixels in two images represented by said opening processing image signal and said closing processing image signal, said operation processing being defined with the formula:

$$fout = \{|fopn - fin|(fopn - fin) + |fcls - fin|(fcls - fin)\} / \{|fopn - fin| + |fcls - fin|\} + fin \quad (4)$$

wherein fin represents the original image signal, fout represents the graininess suppression processing image signal, fopn represents the opening processing image signal, and fcls represents the closing processing image signal.

* * * * *